United States Patent [19]

Kaiser et al.

[11] Patent Number: 5,448,561
[45] Date of Patent: Sep. 5, 1995

[54] METHOD & APPARATUS FOR DATA EXCHANGE IN DATA PROCESSING INSTALLATIONS

[75] Inventors: Karl-Heinz Kaiser, Tamm; Herbert Lohner, Friolzheim; Hans-Joerg Mathony, Stuttgart-Botnang; Jan Unruh, Vaikingen; Uwe Zurmuehl, Hildesheim; Udo Brunke, Diekholzen; Juergen Glasser, Hildesheim; Olaf Linne, Bockenem, all of Germany

[73] Assignee: Robert Bosch GmbH, Stuttgart, Germany

[21] Appl. No.: 947,501

[22] Filed: Sep. 16, 1992

[30] Foreign Application Priority Data

Sep. 19, 1991 [DE] Germany ............ 41 31 133.7

[51] Int. Cl.⁶ .................................. H04L 12/407
[52] U.S. Cl. .................................. 370/85.1; 370/82; 370/85.6; 340/825.5; 340/825.51; 364/424.01
[58] Field of Search ............... 370/85.1, 82, 85.6; 364/431.12, 424.01; 340/825.5, 825.51

[56] References Cited

U.S. PATENT DOCUMENTS

| | | | |
|---|---|---|---|
| 4,999,834 | 3/1991 | Leo et al. | 370/94.1 |
| 5,001,642 | 3/1991 | Botzenhardt | 364/431.12 |
| 5,050,166 | 9/1991 | Cantoni et al. | 370/82 X |
| 5,111,460 | 5/1992 | Botzenhardt et al. | 370/13 X |
| 5,216,674 | 6/1993 | Peter et al. | 371/29.5 |

FOREIGN PATENT DOCUMENTS

| | | | |
|---|---|---|---|
| 41 29 205A1 | 10/1992 | Germany | G06F 13/42 |
| 4129205 | 10/1992 | Germany | G06F 13/42 |

OTHER PUBLICATIONS

Intel Corp., "82526 Serial Communications Controller Architectural Overview," Order # 270678-001, pp. 1-35, Jan. '89.
Adam Greenberg, "Component Vendors Debate Design Issues In Automotive Field", Oct. 26, 1992, Electronic News, pp. 1 and 11, vol. 38.
International Standard 7498: Information Processing Systems-Open Systems Interconnection-Basic Reference Model, 1st Ed., 1984 Oct. 15, Int. Standards Organization, Geneva, & ANSI, N.Y.
International Standard 8802-2: Information Processing Systems-Local Area Networks-Part 2: Logical Link Control, 1st printing 1989 Dec. 31, IEEE, 345 E. 47th, New York, N.Y. 10017-2394; (ISBN 1-55937-019-X, Library of Cong. Cat. Card No. 88-46183).
???, IEEE Standard 802 For Local Area Networks, pp. 141-148.
Infoworld, "Glossary of LAN Terms and Acronyms," Jul. 17, 1989 issue, p. 52 (published San Mateo, Calif. 94402, USA).

*Primary Examiner*—Douglas W. Olms
*Assistant Examiner*—Russell W. Blum
*Attorney, Agent, or Firm*—Frishauf, Holtz, Goodman & Woodward

[57] ABSTRACT

An improved method for exchange of data in data processing installations, especially Controller Areas Networks (CAN), permits acknowledged and segmented transmission of data strings, of arbitrarily long length, between at least two stations in the network or other data processing installation. The method includes the transmission of the messages associated with the data by means of frames; the frames contain a header field and a data field. In the event of contention between multiple stations of the data processing installation for access to the bus connection, which frame has priority is determined by evaluating the respective header fields. In the data field of the frame, there is a control information field (58, 95) containing a message code which serves to identify the message type. The message codes distinguish among activation messages (AR, AC), data messages (DT), and acknowledgement (AK) messages. This permits transmission of data strings, of limited length, with acknowledgement. Further, the control information fields (58, 95) of certain messages contain a sequence number, a receiver status code, a message end code, and a code specifying how many data bytes are being transmitted in the frame. With this additional information, data strings of arbitrarily long length may be transmitted as segments. The receipt of the individual partial messages is confirmed by sending back an acknowledgment in each case.

24 Claims, 10 Drawing Sheets

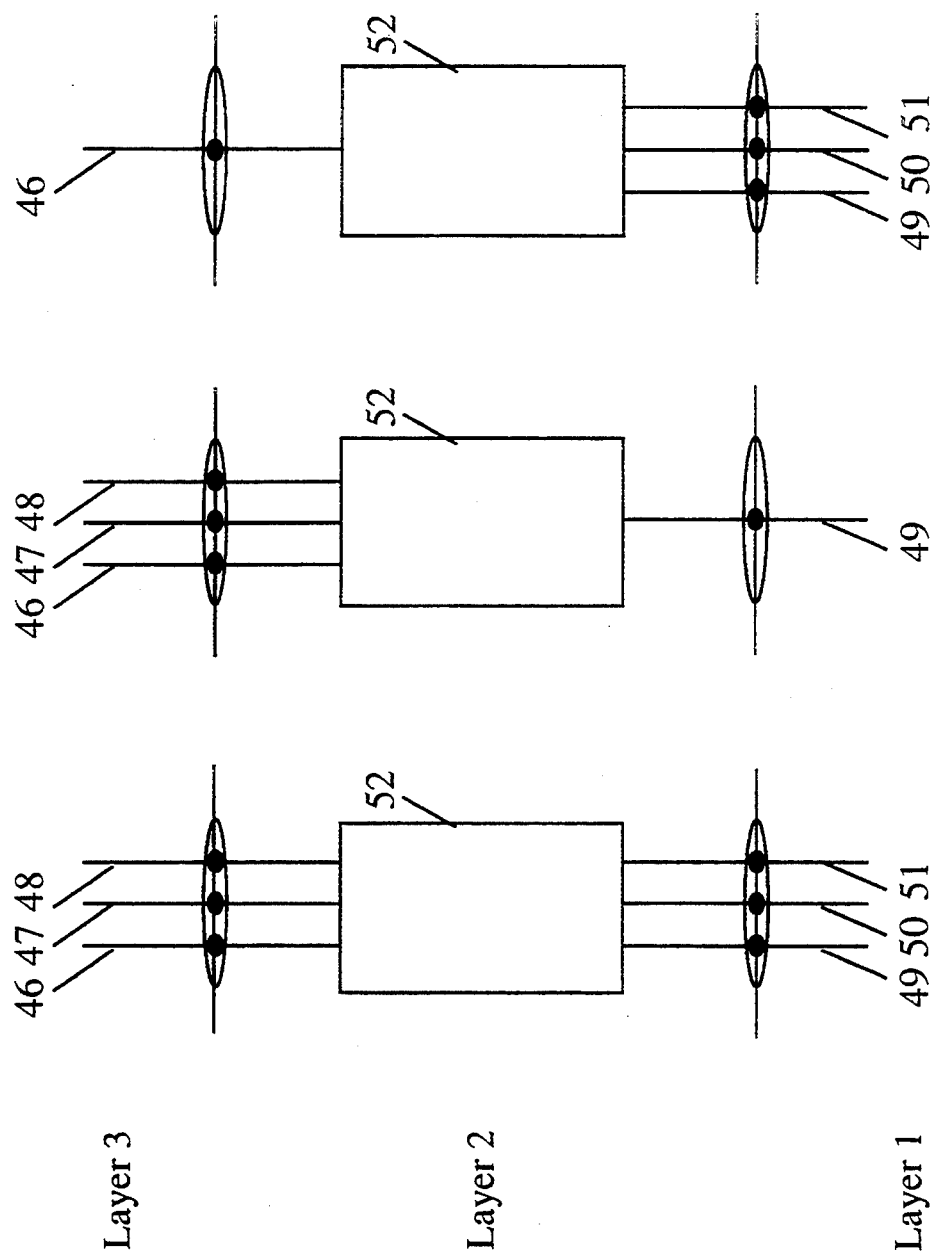

METHOD & APPARATUS FOR DATA EXCHANGE IN DATA PROCESSING INSTALLATIONS

Cross-reference to related patent, assigned to the assignee of the present invention, the disclosure of which is incorporated by reference: U.S. Pat. No. 5,001,642, BOTZENHARDT et al., issued Mar. 19, 1991.

CROSS-REFERENCE TO RELATED LITERATURE

INTERNATIONAL STANDARD ISO 8802-2: 1989, ANSI/IEEE 802.2 Information Processing Systems—Local Area Networks-PART 2; INTERNATIONAL STANDARD ISO 7498, entitled Information Processing Systems—Open Systems Interconnection—Basic Reference Model, published October 1984 by Int. Org. for Standardization, Geneva, and A.N.S.I., New York.

1. Field of the Invention

The present invention relates generally to data transmission methods and protocols and, more particularly, to a Data-Link Protocol and a Transport Protocol for use with a Controller Area Network (CAN) in motor vehicles.

2. Background

In recent years, in the process control field, especially relating to motor vehicles, robots, medical monitoring and analysis devices, hoisting systems and the like, data transmission or exchange between the individual control and regulating units has been facilitated increasingly with the help of methods for serial data exchange. Such a method is known from German Patent DE 35 06 118 C2 and U.S. Pat. No. 5,001,642; it describes the development of data transmission with the aid of a particular data transmission protocol which has become known by the name CAN Protocol.

Further, such a method is described in German patent application DE-P 41 10 428 whose CIP is DE-OS 41 29 205, DIAS & UNRUH (published Oct. 1, 1992).

The interface components, commercially available today, for carrying out data exchange according to the CAN Protocol, cover only the lowest logical layers defined in the ISO/OSI layer model (ISO standards 7498 and 8802.2-8802.3), namely the Physical Layer, the Medium Access Control sublayer (MAC), and parts of the Logical Link Control sublayer (LLC).

In that manner, one cannot transmit data between two or more stations with the receiver of the data confirming the correct receipt of the data, by sending back an acknowledgement message. Further, it is impossible to transmit lengthy data records in a segmented form which permits the receiver, of the individual data segments, to recognize them as belonging to a single data record.

Protocols are known which permit (1) data transmissions assured by acknowledgement messages and (2) segmented transmission of lengthier data records. Such protocols are typically used in connecting two computers. However, these are connection-oriented protocols, which are too elaborate for use in process control applications and are poorly adapted for such applications. For example, ETHERNET includes, in each data frame, extensive control information including, among other things, source and destination information, for transmission on the DATA-LINK layer. In combination with a communications protocol like the CAN Protocol, this high "overhead" would lead, due to the very low amount of data in each frame (0-8 bytes), to a very low through-put of data.

There is a long-felt need, in process control applications such as motor vehicle controls, for a low-overhead way of assuring reliable data transmission and of transmitting long data records.

THE INVENTION

Accordingly, the method of the present invention, employing a control information field in each message, has the advantage over the prior art that, despite the limitations imposed by the process control protocol, reliable data transmission is assured with the aid of an acknowledgment operation. Additionally, longer data records, such as those which occur in the configuration or initialization of components in data processing installations for process control, can be segmented and transmitted with very little effort or "overhead." The segmentation of longer data records and their reliable transmission can be carried out using the present invention in such a manner that only one byte of control information is needed per message. Therefore, the transport protocol of the present invention can advantageously be employed together with communications protocols such as CAN.

It is particularly advantageous, for establishing a message connection, to store in the stations defining the connection, respectively a transmitting object and a receiving object. This can occur upon initialization of the system, so that no messages between the communicating stations need be exchanged to establish the connection, and, during operation, there is never a need to carry along source and destination addresses.

Further, it is advantageous, for activation of a message connection, for one station to generate an activation message whose receipt is acknowledged by the receiving station, and to communicate the activation, of the message connection, to the users of the connection.

In this manner, an additional test of the message connection takes place before the actual data transmission. Further, it is advantageous to include a sequence number in the control information field of the frame, of the data message, or of the acknowledgement message. This permits distinguishing between successive data messages, recognition of duplicate data messages, and an association between acknowledgement messages and data messages.

Further, it is advantageous to include, in the control information field of a frame containing the acknowledgement, a "receiver status" field and to place in it information about the status of the receiver. On that basis, the transmitting station can take suitable measures, such as sending additional frames or delaying the sending of additional frames.

It is advantageous, upon non-receipt of an acknowledgement message, to re-send the data message after a predetermined waiting period and, upon repeated non-receipt of an acknowledgement, to re-send the data message only a predetermined number of times; when the count of retransmissions exceeds the predetermined number, the message connection is de-activated and the fact of the deactivation is communicated to the users of the message connection.

It is advantageous to install a message sequence number counter in the interface component used to create the frame, in order to achieve sequential numbering of data message segments. Further, it is advantageous to install a reception sequence counter, which serves to store the sequence number of the expected next-to-arrive message or next-to-arrive data message segment. For flow control against station overlap, it is advantageous to store the content of the receiver status field in a buffer or intermediate memory. For identification of the number of data segments, it is further advantageous to provide a data segment memory in the apparatus, and for identification of the total length of the data bytes of a data message or of a data message segment, to install a data length memory.

DRAWINGS

FIG. 1 illustrates where the method of the invention fits in the ISO/OSI layer model;

FIG. 2 schematically represents a point-to-point connection within a layer of the ISO/OSI layer model;

FIG. 4a is a schematic illustration of the association of three Data-Link or Transport connections to three individual CAN-connections within the ISO/OSI layer model;

FIG. 4b is a schematic illustration of the association of three Data-Link or Transport connections to a single CAN-connection within the ISO/OSI layer model;

FIG. 4c is a schematic illustration of the association of a single Data-Link or Transport connection to three CAN-connections within the ISO/OSI layer model;

DETAILED DESCRIPTION

1.1. FEATURES OF THE METHOD:

The method of the present invention, as described in the exemplary embodiment, builds on the foundation of the CAN protocol. However, it could equally well be installed on the basis of another process control protocol, such as V.A.N. or J1850 (promulgated by Society of Automotive Engineers).

The method of the invention makes possible reliable exchange of data among two stations which communicate using the CAN protocol or another process control protocol.

Figure 1:
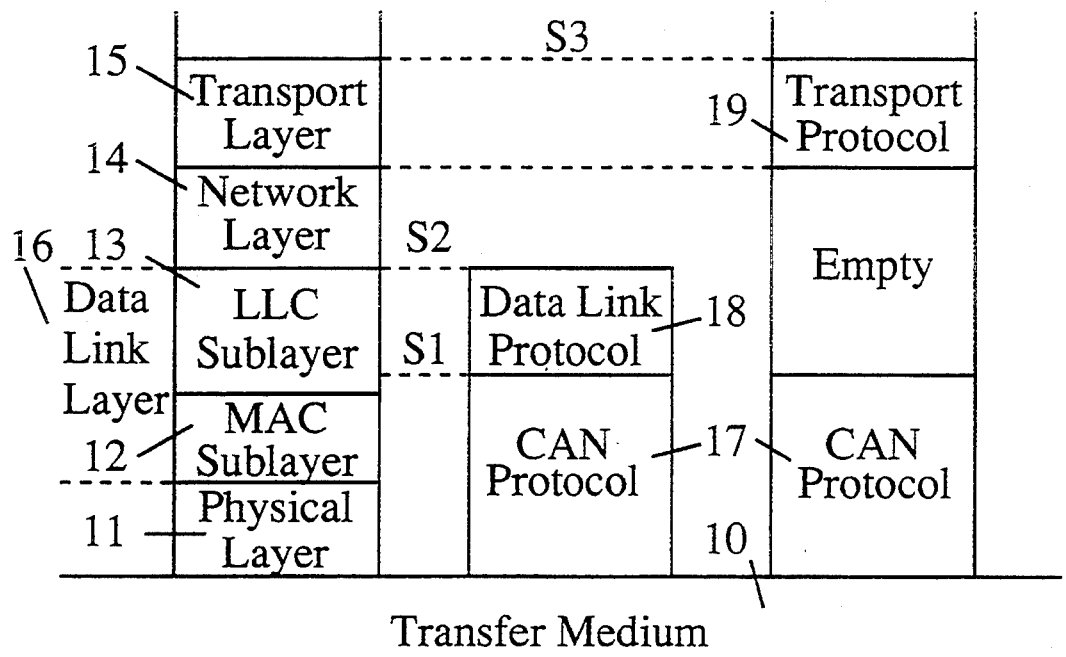

FIG. 1 illustrates the position of CAN protocol 17 within the ISO/OSI layer model. The CAN protocol covers the bit Physical Layer (11) and parts of the Data Link Layer (16). Data Link layer 16 is subdivided into a MAC (Medium Access Control) sublayer 12 and an LLC (Logical Link Control) sublayer type 1,2,3 operation 13.

Above Data Link Layer 16 are arranged Network Layer 14 and, above it, Transport Layer 15. At the interface S1 of CAN protocol 17 with Data Link Layer 16, CAN protocol 17 provides a service for unacknowledged transmission of data consisting of between one and eight bytes in a frame or Protocol Data Unit (PDU). This service is comparable to the ISO 8802-2 Unacknowledged Connectionless-Mode Data Transfer Service Type 1 Operation. Building on this service, the present invention makes possible:

1) The acknowledged transmission of a frame between two stations (comparable to ISO 8802-2 LLC Acknowledged Connectionless-Mode Service—Type 3 Operation). The protocol which provides the acknowledged transmission service is associated with ISO/OSI Data Link Layer 16 and will hereinafter be referred to as Data Link Protocol 18 (see following section 1.3, below).

2) The reliable, segmented transmission of arbitrarily long data strings between two stations. The protocol providing the service of transmitting longer data is associated with ISO/OSI Transport Layer 15 and will hereinafter be referred to as Transport Protocol 19 (see section 1.4 below).

Data transmission according to the method of the present invention is accomplished via virtual data-link and transport connections which are specified upon projection of the network and upon system initialization for the duration of the system operating time period. The virtual data-link and transport connections are thus message connections between two stations of the data processing installation, which are only used at specific times (in each case after activation of a connection). The transmission of messages occurs, with each message connection, via the same transmission medium 10, which connects the individual stations of the data processing system with each other. Thus, the data-link connection is offered to the data-link user as a service of the Data-Link Layer. A transport connection is offered as a service of the Transport Layer to the transport user. Since the connections are already set up in the network projection phase, their establishment requires no exchange of messages between the communicating entities.

Before the beginning of the actual, arbitrarily long data transmission phase, a so-called "connection activating phase" occurs, in which the communication readiness of the protocol entities, providing the connection service, is checked by means of a "handshaking" procedure. After successful connection activation, the communication partners know that a connection is available for the communication, and that the protocol entities, providing the connection service, are in "ready" states for transmission and reception. The activation of a connection is triggered by one of the two communication partners or by a network management stage associated with the corresponding layer. In the event of repeatedly occurring error, a connection can be automatically deactivated.

The renewed activation (re-activation) of a deactivated connection causes the protocol entities, providing the connection service, to be reset and thus placed again in a state in which they can exchange data.

Figure 2:
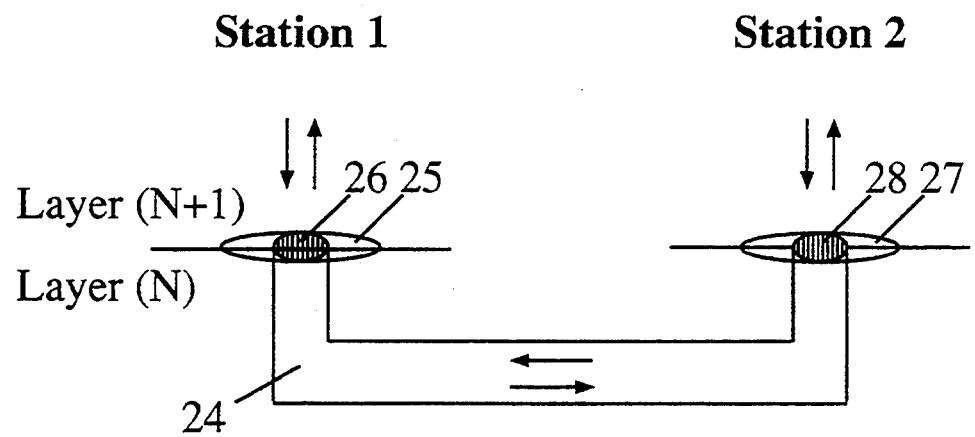

1.2 CONNECTIONS:

FIG. 2 illustrates the exchange of data via point-to-point connections in the sense of the ISO/OSI layer model. A connection 24 operates between two protocol entities of layer N and is offered as a service to the users of layer N. After the establishment of connection 24, the users of layer N can exchange data via this connection 24 according to the protocol of layer N. For this purpose, the user applies a corresponding service request, consisting of a command (e.g. T_DATA.request) and the data to be transmitted to the Connection End Point (CEP) (26,28), of the Service Access Point (SAP) (25,27). The service request need not be accompanied by any source- or destination-addresses, since this information is implicit in the connection used. In principle, data can be exchanged, via a connection, in both directions.

The method of the invention recognizes 3 distinct types of connections:

1) CAN connections are offered at Interface S1 (FIG. 1) on the basis of the CAN protocol.
2) Data-link connections are offered at Interface S2 (FIG. 1) on the basis of one or multiple CAN connections.
3) Transport connections are offered at Interface S3 (FIG. 1) on the basis of one or multiple CAN connections.

Figure 3A:
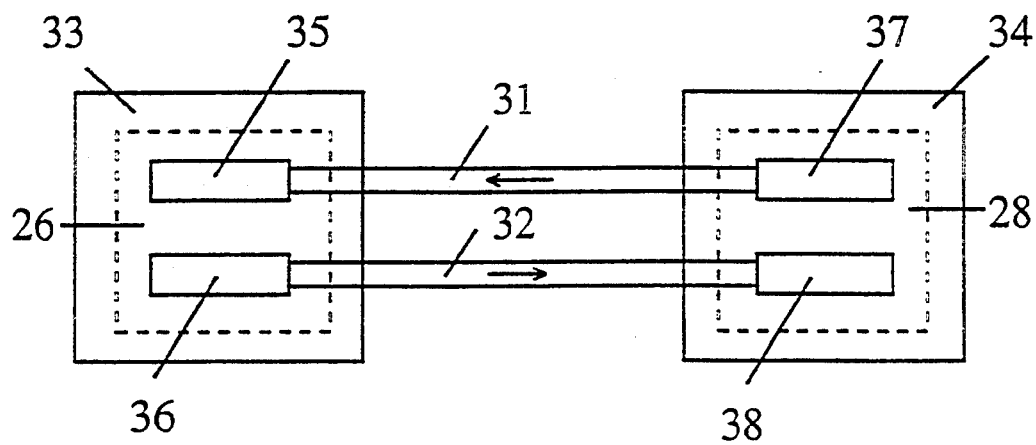
FIG. 3a illustrates one embodiment of a CAN-connection between two stations of a data processing system.
Figure 3B:
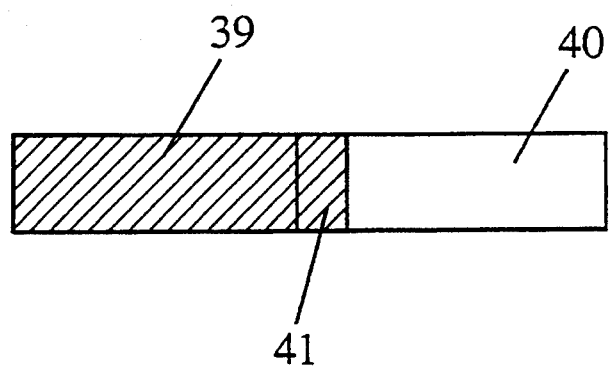
FIG. 3b illustrates the format of a transmitting or receiving object.

FIG. 3a is an example of a CAN connection. FIG. 3b illustrates the structure of a sending or transmitting object 36, 37 and of a receiving object 35, 38. The term "object" is defined in the Microsoft Press Computer Dictionary as "in object-oriented programming, a variable comprising both routines and data that is treated as a discrete entity." Each sending or receiving object has a header field 39 and a data field 40. The header field 40 will hereinafter be designated IDENTIFIER. The last bit field 41 of the IDENTIFIER is specially shown in FIG. 3b. Each station-transcending SEND/RECEIVE object pair 36, 38 or 37, 35 with the same IDENTIFIER 39, but differing value of the RECEIVE/-TRANSMIT bit (LOW for the sending object and HIGH for receiving object) defines a respective channel 32 or 31, through which data can be transmitted in one direction. The values of the two IDENTIFIERS 39 which define the connection, are arbitrary, in principle. However, it is suitable to select 2 values for IDENTIFIER 39 which are identical, except for last bit field 41. The last bit 41 therefore specifies the data direction, from the viewpoint of one of stations 33, 34. The connection itself, and its priority can then be identified in a simple manner by the first n−1 bits of IDENTIFIER 39. Within a station, the SEND/RECEIVE object pair of a connection represents the Connection End Point (CEP), 46 . . . 51.

On the basis of CAN-connections, connections in higher layers (Data-Link Layer, Transport Layer, etc.) can be established during network projection. The addressing of these connections, and the formation of connections of layer N+1 on connections of layer N, can be carried out according to ISO Standard 7498, the aforementioned Basic Reference Model.

FIG. 4a illustrates schematically the formation of connection 46 in the upper layer 2 on the connection 49 in the lower layer 1 with the help of a protocol entity 52 in layer 2. In similar fashion, connection 47 in layer 2 is built on connection 50 in layer 1, and connection 48 is built on connection 51, with the help of protocol entity 52.

Protocol entity 52 of layer 2 may be, for example, a data-link or transport protocol entity. Connections 49, 50, and 51 represent three CAN-connections, which are operated in layer 1 with the help of a CAN protocol entity.

FIG. 4b, by contrast, illustrates the formation of three connections 46, 47, 48 of layer 2 on merely one CAN-connection 49 in layer 1. This corresponds to a multiplex mode of protocol entity 52. See also ISO 7498, section 5.7.5.

FIG. 4c illustrates the formation of connection 46 of layer 2 on three connections 49, 50, and 51 in layer 1. This corresponds to a "splitting" mode of protocol entity 52.

On the basis of the extended CAN protocol, it is possible to establish a connection between one sender or transmitter and multiple receivers, and to transmit data, with acknowledgement, via a so-called "multi-point connection." The first 10 bits of the short identifier in the extended CAN protocol identify the connection. The last bit of the short identifier specifies the data direction. Upon receipt of a frame, the receivers evaluate the short identifier and take over the frame. The receivers confirm the takeover of the frames by sending an acknowledgement message, in which the last 18 identifier bits ("Identifier Extension"), of the frame which carries the acknowledgment, identify the sender of the acknowledgement message.

1.3 DESCRIPTION OF THE DATA-LINK PROTOCOL:

The Data-Link Protocol 18 makes possible the connection-oriented, acknowledged transmission of an individual data message between two users of Data Link Layer 16. Data are transmitted via virtual Data-Link connections (see section 1.2). The arbitrarily long data transmission phase begins after successful connection activation (see section 1.1). Following sending out of a data message, the receipt of a correct acknowledgement demonstrates that the data message being acknowledged was correctly received, and that the receipt of the message was indicated to the data-link user in the receiving station. Whenever, after a specific predetermined period of time, the acknowledgement is not received, the data link protocol independently repeats the sending of the data message. After repeated, unsuccessful transmission of the data message, the connection which was used is deactivated. The result of the transmission and the deactivation of a connection are indicated to the user. With reference to one connection, after sending out of a data message, the next data message can only be transmitted if the acknowledgement for the preceding data message has been received.

1.3.1 SERVICES (see TABLE 1)

1.3.1.2 PROTOCOL INITIALIZATION:

The service elements for the initialization of the Data-Link Protocol 18 are D_INIT.req and D_INIT.con. The initialization is requested with D_INIT.req and confirmed with D_INIT.con. The effect of the initialization is only local: the variables of Data-Link Protocol 18 are occupied by their predetermined or pre-set values (see Table 2).

1.3.1.2 CONNECTION ACTIVATION:

The service elements for the activation of a data-link connection are D_ACTIVATE.req, D_ACTIVATE.ind and D_ACTIVATE.con. The effect of D_ACTIVATE.req is that the protocol entities providing the connection service are placed in a communication-ready state, with the protocol variables taking on their pre-set values. Whenever a connection user A places the service request D_ACTIVATE.req, upon successful activation, this is indicated to the connection user B in the remote station by means of D_ACTIVATE.ind. Service element D_ACTIVATE.con confirms the service request.

1.3.1.3 DATA TRANSMISSION:

The service elements for data transmission are D_DATA_ACK.req, D_DATA_ACK.ind and D_DATA_ACK.con. One uses D_DATA_ACK.req to request the transmission with acknowledgement of data (Parameter: DATA) of the length DATA_LENGTH. After correct transmission, the receipt of the data is indicated to the communication partner by means of service element D_DATA_ACK.ind. The result of the transmission is confirmed to the service requester by means of service element D_DATA_ACK.con.

1.3.1.4 CONNECTION DEACTIVATION:

After repeated, unsuccessful transmissions, a connection is deactivated by the service provider. The deactivation is indicated to the service user by means of the service element D_DEACTIVATED.ind.

companying Data Packet Control Information (DPCI), contained in the control information field of the frame which is transmitting the message. The control information consists of, at most, one byte, and is located in data field 57 of a CAN frame See also ISO 8802-2, page 22, "primitives"

Figure 6:
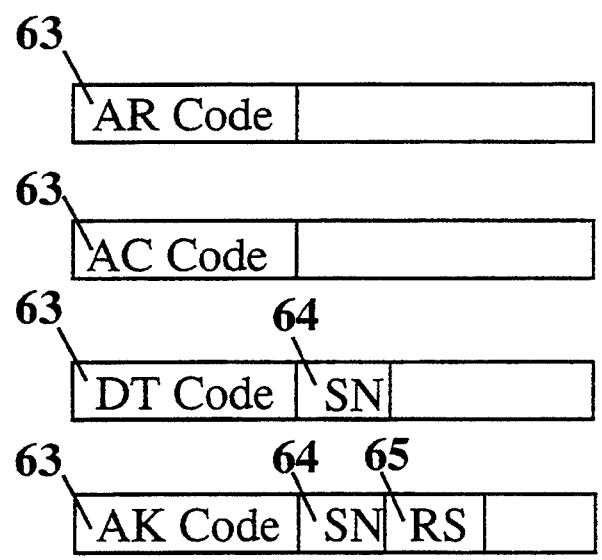
FIG. 6 illustrates the format of the CONTROL INFORMATION field of the frames during transmission of various data-link messages.

FIG. 6 illustrates the constitution of control information fields 58 for the frames for transmission of various message types. For distinguishing among the four message types, a field 63, containing the message code, is provided within control information field 58. The message code generally consists of two bits. Another possibility is to allocate only one bit for the message code of data messages, and to allocate two or more bits for the message codes of message types AR, AC, and AK.

Further, the control information fields 58 of the frames for transmission of message types DT and AK contain an additional field 64 containing a sequence number SN. The sequence number serves to distinguish successive DT messages, for the association of acknowledgement messages AK with data messages DT, and for recognition of message duplications. Field 64 for holding sequence number SN encompasses at least one bit. The control information field 58 of frames for transmission of acknowledgement messages AK addi-

TABLE 1

| PHASE | SERVICE ELEMENTS | PARAMETER |
| --- | --- | --- |
| PROTOCOL INITIALIZATION | D_INIT.req<br>D_INIT.con | ( )<br>(INIT_STATUS) |
| CONNECTION ACTIVATION | D_ACTIVATE.req<br>D_ACTIVATE.ind<br>D_ACTIVATE.con | ( )<br>( )<br>(CONNECTION_STATUS) |
| DATA TRANSMISSION | D_DATA_ACK.req<br>D_DATA_ACK.ind<br>D_DATA_ACK.con | (DATA_LENGTH, DATA)<br>(DATA_LENGTH, DATA)<br>(TRANSFER_STATUS) |
| CONNECTION DEACTIVATION | D_DEACTIVATED.ind | ( ) |

1.3.2 DATA-LINK MESSAGES:

A message is transmitted using a frame. The frame has a header field (IDENTIFIER) and a data field. Data-link connections are, as explained in the foregoing descriptions of FIGS. 2, 3a, 3b, 4a, 4b, and 4c, formed by a data-link protocol entity on the basis of CAN connections. A data-link message is thus transmitted with a frame, which has the same format as a CAN frame (or PDU-see ISO 8802-2, page 19). The Data-Link Protocol distinguishes four types of messages:

| | |
| --- | --- |
| AR (ACTIVATION REQUEST) | Activation message for activation of a Data-Link connection. |
| AC (ACTIVATION CONFIRM) | Confirmation message for confirmation of activation of a Data-Link connection. |
| DT (DATA) | Data message for transmission of data via a Data-Link connection. |
| AK (DATA ACKNOWLEDGEMENT) | Acknowledgement message for confirmation of receipt of a data message via a Data-Link connection. |

Figure 5:
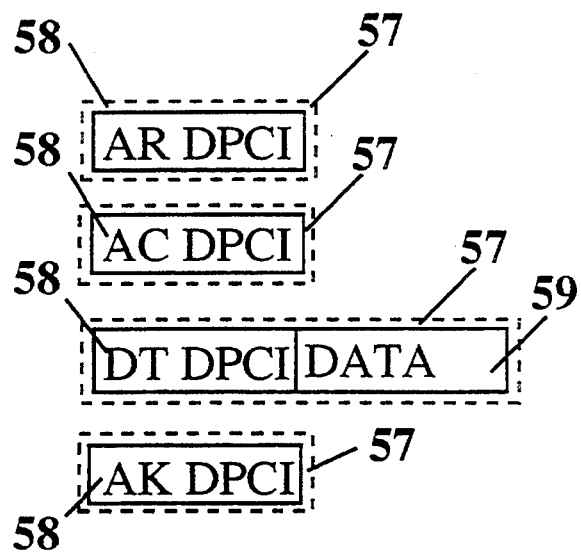
FIG. 5 illustrates the format of the DATA field of the frame during the transmission of various data-link messages.

FIG. 5 illustrates the data fields 57 of frames which transmit the individual messages of the Data-Link Protocol. Data field 57 contains, in the cases of messages AR, AC, DT and AK, a control information field 58 and, in the case of data message DT, additionally a field 59 to contain the data which are to be transmitted with this message DT. Field 59 can hold a maximum of 7 bytes of data. The message type is identified by an actionally contains a receiver status field 65. In receiver status field 65, information RS about the status of the receiver is placed. This information can be used for flow control against station overlap. Receiver status field 65 encompasses at least 1 bit for indicating whether the receiver is ready to receive, or not.

1.3.3 VARIABLES AND PARAMETERS:

The protocol uses the following variables and parameters (see Table 2):

1) Sending sequence variable V(S)

Variable for successive numbering of data messages DT. V(S) can assume the values 0 and 1. After receipt of a correct acknowledgement message AK, the value of V(S) is complemented (changed from 1 to 0 or vice versa).

2) Receipt sequence variable V(R)

Variable for storing the sequence number of the expected next-to-be-received data message DT. V(R) can assume the values 0 and 1. After correct receipt of the expected data message DT, the value of V(R) is complemented (changed from 1 to 0 or vice versa).

3) Connection status variable V(C)

Variable for storing the status of a connection. The variable can assume the values NOT_ACTIVATED, DEACTIVATED, RECEIVE_READY and RECEIVE_NOT_READY.

4) Repetition Count variable RC

Variable for storing the actual count of transmission repetitions of messages of types AR and DT.

5) DPDU-Variable SN

Sequence number variable of message types AR and DT.

6) DPDU-Variable RS

Variable of acknowledgement message AK for characterizing the status of the receiving protocol entity. RS can assume the values RR (RECEIVE READY) and RNR (RECEIVE NOT READY).

7) Protocol parameter MNT

MNT is the Maximum Number of Times for automatic transmission repetition for a data message DT or for an activation request message AR.

8) Protocol parameter $T_A$ $T_A$ is is the time period within which an acknowledgement message AK or an Activation Confirmation message AC is expected.

2) START_UP

In state START_UP, the data-link sending protocol entity waits for Activation Confirmation AC from the addressed data-link receiving protocol entity. Upon receipt of Activation Confirmation AC or upon receipt of Activation Request AR (connection activation desire of the data-link receiving protocol entity), the data-link sending protocol entity switches into state IDLE (Transition arrow 73), in which it awaits requests for acknowledged transmission of data; the addressed data-link receiving protocol entity goes quasi-simultaneously into state READY (Transition arrow 85 of FIG. 8). If the Activation Confirmation AC has not been received within allotted time $T_A$ (Event TA_EXPIRED and RC<MNT), the sending of the Acti-

TABLE 2

| NAME | MEANING | VALUE RANGE | PRE-SETTING |
|---|---|---|---|
| | | PROTOCOL VARIABLES | |
| V(S) | SENDING SEQ. COUNTER | [0, 1] | 0 |
| V(R) | RECEIPT SEQ. COUNTER | [0, 1] | 0 |
| V(C) | CONNECTION STATUS | [NOT_ACTIVATED, DEACTIVATED, RECEIVE_READY, RECEIVE_NOT_READY] | NOT_ACTIVATED |
| RC | REPETITION COUNTER | [0, MNT] | 0 |
| | | DPDU VARIABLES | |
| SN | SEQUENCE NUMBER | [0, 1] | 0 |
| RS | RECEIVER STATUS | [RR, RNR] | — |
| | | PROTOCOL PARAMETERS | |
| MNT | | Maximum Number of Times for re-transmission | |
| $T_A$ | | Time Allotted for acknowledgment | |

1.3.4 STATE DIAGRAMS AND AUTOMATON TABLES

Figure 7:
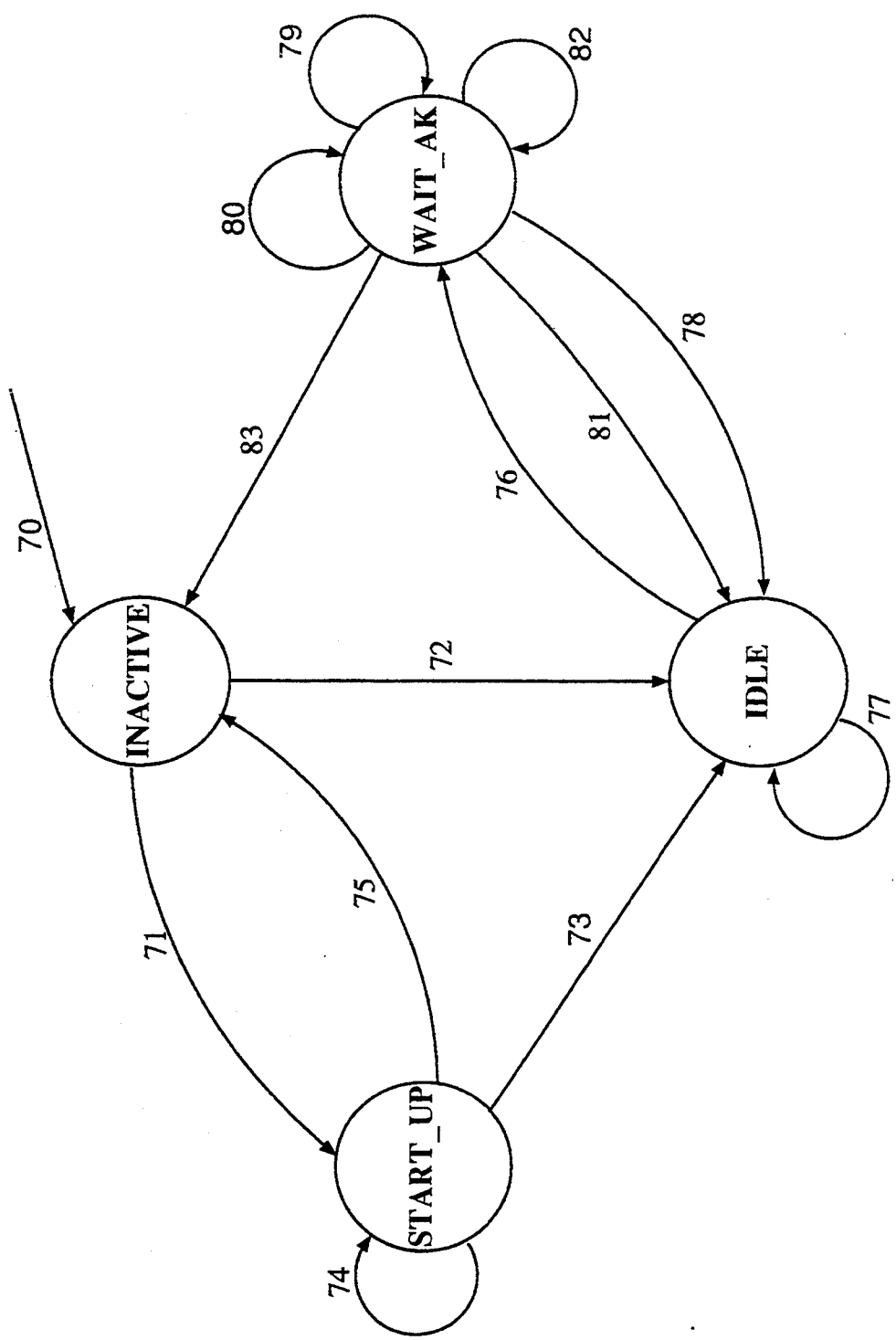
FIG. 7 is a state diagram of a data-link transmitting protocol example.

1.3.4.1 STATE DIAGRAM OF THE DATA-LINK SENDING PROTOCOL ENTITY:

FIG. 7 is a state diagram of the data-link sending protocol entity (compare ISO 8802-2, page 72). The states are represented as circles. The transitions between states are represented by numbered transition arrows, some of which form loops. A transition occurs because of specific events. In the course of the transitions, generally specific actions are carried out. Which events lead to the transitions, and which actions are carried out in the course of the transitions, can be seen from the automaton table in section 1.3.4.2 below. As shown in FIG. 7, the data-link sending protocol entity has the following states:

1) INACTIVE

The state INACTIVE is assumed after the initialization of the protocol entity. In this state, the protocol entity waits for the request for activation of the connection (Event D_ACTIVATE$_{REQ}$) or for the receipt of an activation request AR of a peer protocol entity. Whenever the event D_ACTIVATE$_{REQ}$ occurs, the activation request AR is sent to the data-link receiving protocol entity (Action SEND (AR)) and the next state START_UP is assumed (Transition arrow 71).

Whenever in state INACTIVE (before receipt or input of the connection activation request) the activation request AR for connection activation occurs (Event RECEIVE_AR), an activation confirmation AC is sent (Action SEND (AC)) and the next state IDLE is assumed (Transition arrow 72), in which the data-link sending protocol entity awaits requests for transmissions of data with acknowledgements.

vation Request AR is automatically repeated (Transition arrow 74). After MNT unacknowledged transmissions of Activation Request AR (Event TA_EXPIRED and RC=MNT), the data-link sending protocol entity goes into state INACTIVE and indicates the unsuccessful connection activation to the user (Transition arrow 75).

3) IDLE

In state IDLE, the data-link sending protocol entity awaits requests for acknowledged transmission of data. Upon occurrence of the corresponding event D_DATA_ACK_REQ, a data message DT (with the control information and the data to be transmitted) is sent (Action SEND (DT)), and the next state WAIT_AK is assumed (Transition arrow 76). Whenever, in IDLE state, an Activation Request AR for connection activation occurs (Event RECEIVE_AR), the pre-set values are loaded into the protocol variables and an Activation Confirmation is sent (Action SEND (AC)); the connection action is indicated to the user (Action D_ACTIVATE_IND), (Transition arrow 77).

4) WAIT_AK

In state WAIT_AK, the data-link sending protocol entity waits for the arrival of the acknowledgement message AK, which is supposed to confirm the correct receipt of the preceding data message DT. If the expected acknowledgement arrives (Event RECEIVE_AK (SN<>V(S)), the successful transmission of the data is indicated to the user, and the subsequent state IDLE is assumed (Transition arrow 78). If, after expiration of allocated time $T_A$, the acknowledgement AK has not been received (Event TA_EXPIRED and (RC<MNT)), the last data message DT will be retransmitted. After MNT unacknowledged transmissions of data message DT (Event TA_EXPIRED and (RC<MNT)), the connection is deactivated; the data-link sending protocol entity goes back into the state INACTIVE and indicates the unsuccessful transmission and the deactivation of the connection to the user (Transition arrow 83). Acknowledgements with incorrect sequence numbers (Event RECEIVE_AK (SN=V(S), RS=RR)) are ignored in state WAIT_AK (Transition arrow 79). If an acknowledgement AK arrives, which indicates that the receiving protocol entity is not reception-ready (Event RECEIVE AK) SN=V(S), RS=RNR)), the retransmission of the preceding data transmission DT is delayed (Transition arrow 80). Whenever, in state WAIT_AK, a message AR for connection activation arrives (Event RECEIVE_AK), the protocol variables are loaded with their preset values, a confirmation message AC is sent (Action SEND (AC)), and the subsequent state IDLE is assumed (Transition arrow 81). The ongoing data transmission is thus broken off; the unsuccessful data transmission and the connection deactivation are indicated to the user.

1.3.4.2 AUTOMATON TABLE OF THE DATA LINK SENDING PROTOCOL ENTITY

Table 3 is an automaton table for the data-link sending protocol entity. The left column contains the respective transition numbers shown in FIG. 7.

STATES: (Description above in Section 1.3.4.1)
1) INACTIVE
2) START_UP
3) IDLE
4) WAIT_AK EVENTS:
1) D_ACTIVATE$_{REQ}$
Receipt of a request for connection activation.
2) RECEIVE_AR
Receipt of an order for connection activation.
3) RECEIVE_AC
Receipt of a confirmation of connection activation.
4) TA_EXPIRED and (RC<MNT)
Allotted time for the arrival of a confirmation message AC or acknowledgement message AK has expired. The maximum number of times for retransmissions has not been exceeded.
TA_EXPIRED and (RC=MNT)
Allotted time for the arrival of a confirmation message AC or acknowledgement message AK has expired. The maximum number of times for retransmissions has been reached.
6) D_DATA_ACK_REQ (DATA_LENGTH, DATA)
Receipt of a request for transmission of DATA of length DATA_LENGTH.
7) RECEIVE_AK (SN<>V(S))
Receipt of an acknowledgement which confirms the correct receipt of the preceding data transmission DT.
8) RECEIVE_AK (SN=V(S), RS=RR)
Receipt of an acknowledgement whose sequence number SN is identical with the sequence number of the preceding data transmission DT. This event can occur when expiration of an alloted time has resulted in a retransmission of a data transmission DT; the receiver recognizes this message as a duplicate. The status information RS indicates that the receiver is in a reception-ready condition.
9) RECEIVE_AK (SN=/V (S), RS=RNR)
Receipt of an acknowledgement, whose sequence number SN is identical with the sequence number of the preceeding data transmission DT. This event can occur if the data link receiving protocol entity cannot receive and process a data transmission DT. The status information RS=RNR indicates the receiver is not in a reception-ready condition.

ACTIONS/FUNCTIONS:
1) SEND (AR)
Sending of an activation message AR to activate a connection.
2) SEND (DT)
Sending of a data message DT.
3) SEND AC
Sending of an acknowledgement confirmation AC to confirm the activation of a connection.
4) RESEND_AR
Repetition of sending of an activation message AR for activation of a connection.
5) RESEND_LAST_DT
Repetition of sending of the last data message DT.
6) START_T$_A$
Resetting and starting of the timer for monitoring of allotted time T$_A$.
7) CANCEL_TA
Resetting of the timer for monitoring of allotted time T$_A$.
8) RC:=1
Setting of the sending repetition variable RC to the value 1.
9) RC:=RC+1
Incrementing of repetition counter RC by the value 1.
10) V(S):=1−V(S)
Complementing of sending sequence variable V(S).
11) V(C):=RECEIVE_READY
Setting of connection status variable V(C) to the value RECEIVE READY.
12) V(C):=DEACTIVATED
Setting of the connection status variable V(C) to the value DEACTIVATED.
13) V(C):=NOT_ACTIVATED
Setting of the connection status variable V(C) to the value NOT_ACTIVATED.
14) RESET_VARIABLES ()
Loading of the protocol variables with the preset values (see Table 2).
15) DT:=DT(SN=V(S))
Formation of a data message DT. The sequence number variable SN is set to the value of sending sequence variable V(S).
16) D_ACTIVATE_CON ( CONNECTION_STATUS=V(C))
Confirmation of connection activation service.
17) D_ACTIVATE IND ()
Indication of activation of a connection.
18) D_DATA_ACK_CON (TRANSFER STATUS:=SUCCESS)
Positive confirmation of data transmission service.
19) D_DATA_ACK_CON (TRANSFER STATUS:=NO SUCCESS)
Negative confirmation of data transmission service.
20) D_DEACTIVATED_IND ()
Indication of an automated deactivation of a connection.

| ARROW | STATE | RESULT | ACTION(S) | SUBSEQ. STATE |
|---|---|---|---|---|
| 71 | INACTIVE | D_ACTIVATE_REQ | SEND (AR)<br>START_TA<br>RC: = 1 | START_UP |
| 72 | INACTIVE | RECEIVE_AR | SEND (AC)<br>V(C):=RECEIVE_READY<br>D_ACTIVATE_IND 0 | IDLE |
| 73 | START_UP | RECEIVE_AC<br>or<br>RECEIVE_AR | CANCEL_TA<br>V(C):=RECEIVE READY<br>D_ACTIVATE_CON<br>(CONNECTION_STATUS:=<br>V(C) | IDLE |
| 74 | START_UP | TA_EXPIRED<br>and<br>(RC < MNT) | RESEND_AR<br>START_TA<br>RC:=RC + 1 | START_UP |
| 75 | START_UP | TA_EXPIRED<br>and<br>(RC = MNT) | RESET VARIABLES ( )<br>V(C):=NOT_ACTIVATED<br>D_ACTIVATE_CON<br>(CONNECTION_STATUS:=<br>V(C)) | INACTIVE |
| 76 | IDLE | D_DATA_ACK_REQ<br>(DATA_LENGTH,<br>DATA) | DT:=DT(SN:=V(S))<br>SEND (DT),<br>START_TA<br>RC:=1 | WAIT_AK |
| 77 | IDLE | RECEIVE_AR | RESET_VARIABLES ( )<br>SEND (AC)<br>D_ACTIVATE_IND ( ) | IDLE |
| 78 | WAIT_AK | RECEIVE_AK<br>(SN <> V(S)) | CANCEL_TA<br>V(S):=1 − V(S)<br>D_DATA_ACK_CON<br>(TRANSFER_STATUS:=<br>SUCCESS)<br>RC:=0 | IDLE |
| 79 | WAIT_AK | RECEIVE_AK<br>(SN=V(S),RS=RR) | (NO ACTION) | WAIT_AK |
| 80 | WAIT_AK | RECEIVE_AK<br>SN=V(S),RS=RNR) | START_TA | WAIT_AK |
| 81 | WAIT_AK | RECEIVE_AR | RESET_VARIABLES ( )<br>SEND (AC)<br>D_DATA_ACK_CON<br>(TRANSFER_STATUS :=<br>NO_SUCCESS)<br>D_ACTIVATE_IND ( ) | IDLE |
| 82 | WAIT_AK | (TA_EXPIRED)<br>and (RC < MNT) | RESEND_LAST_DT<br>START_TA<br>RC:=RC+1 | WAIT_AK |
| 83 | WAIT_AK | (TA_EXPIRED)<br>and (RC = MNT) | RESET _VARIABLES ( )<br>V(C):=DEACTIVATED<br>D_DATA_ACK_CON<br>(TRANSFER_STATUS:=<br>NO_SUCCESS)<br>D_DEACTIVATED_IND ( ) | INACTIVE |

1.3.4.3 STATE DIAGRAM OF THE DATA-LINK RECEIVING PROTOCOL ENTITY

Figure 8:
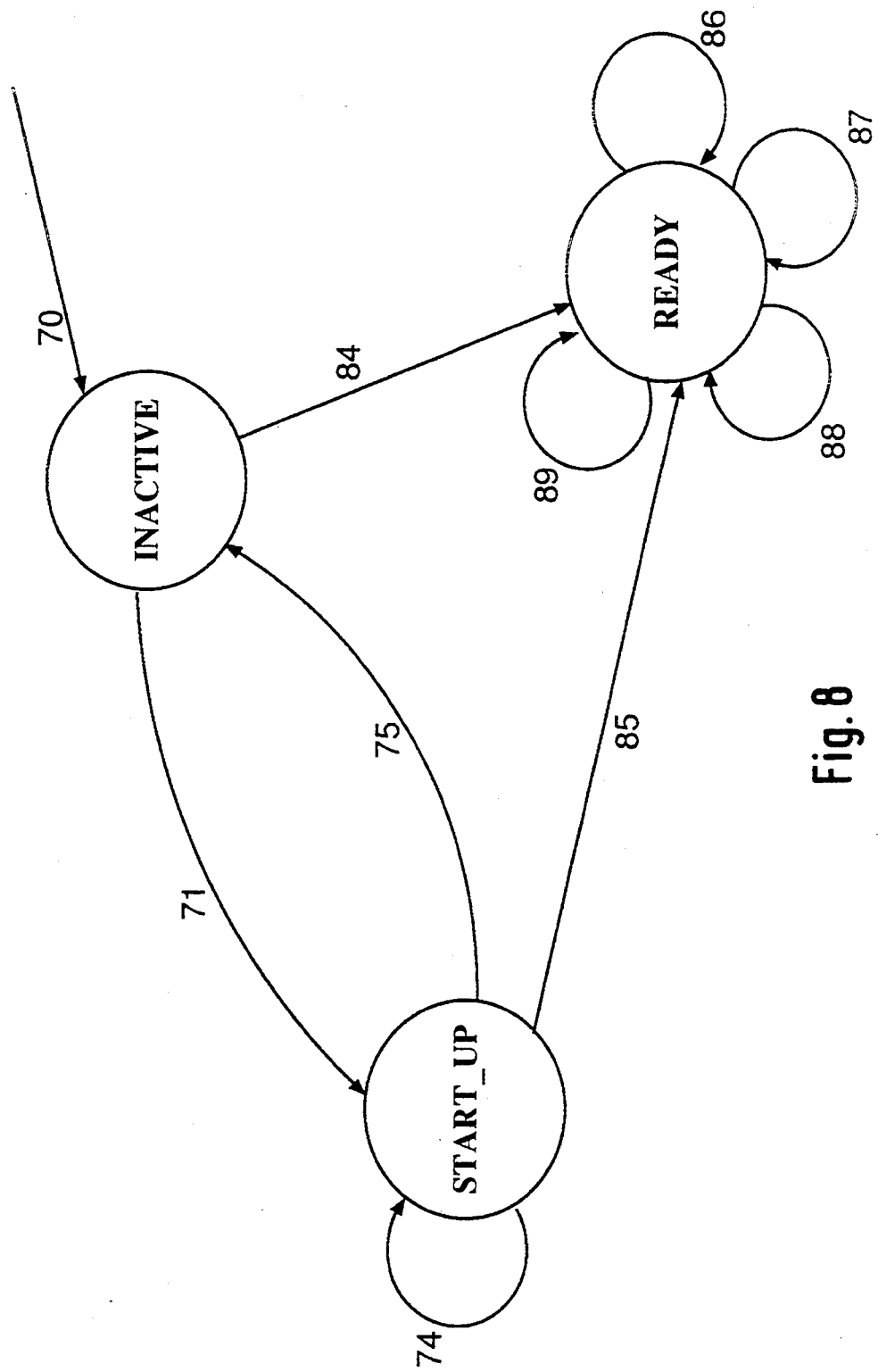
FIG. 8 is a state diagram of a data-link receiving protocol example.

FIG. 8 is a state diagram of the data-link receiving protocol entity. FIG. 8 has the same format as FIG. 7. The data-link receiving protocol entity has the following states:

1) INACTIVE

The data link receiving protocol entity finds itself in state INACTIVE after the initialization. In this state, the data link receiving protocol entity waits for a request for activation of a connection (Event D_ACTIVATE_REQ) or for the receipt of an activation message AR of the peer protocol entity. Whenever the event D_ACTIVATE_REQ occurs, the activation message AR is sent to the data link sending protocol entity (Action SEND (AR)) and the subsequent state START_UP is assumed (Transition arrow 71).

Whenever in state INACTIVE (prior to receipt of the connection activation order), the activation message AR for connection activation is received (Event RECEIVE_AR), a confirmation message AC is sent (Action SEND (AC)) and the subsequent state READY is assumed, in which the data link receiving protocol entity is ready to receive data (Transition arrow 84).

2) START_UP

In the state START_UP, the data link receiving protocol entity awaits the confirmation message AC (confirmation of activation of the connection) from the addressed data link sending protocol entity. After receipt of the confirmation message AC or after receipt of an activation message AR (desire of the data link sending protocol entity for activation of a connection) the data link receiving protocol entity switches into the state READY, in which it is ready to receive data (Transition arrow 85).

The corresponding data-link sending protocol entity goes quasi-simultaneously into the state IDLE (see transition arrow 73 in FIG. 7). Whenever, after expiration of allotted time $T_A$, confirmation message AC has not been received (Event TA_EXPIRED and (RC <MNT)), the sending of the Activation Request AR is automatically repeated (Transition arrow 74). After MNT unacknowledged transmissions of Activation Request AR (Event TA_EXPIRED and (RC=MNT)), the data-link sending protocol entity goes back into state INACTIVE, and indicates the lack of success, in connection activation, to the user (Transition arrow 75).

3) READY

In state READY, the data-link receiving protocol entity awaits input of a data message DT. After receipt of a corresponding message with the expected sequence number (Event RECEIVE_DT (SN=V(R)), the receipt is indicated to the user, and an acknowledgement message AK is sent (Action SEND (AK)) as shown by Transition arrow 86. Whenever, upon input of a Data Transmission DT, the data-link receiving protocol entity is not reception-ready, the message AK is quashed, and this is indicated to the transmitter by transmission of an acknowledgement AK with unchanged sequence number (=sequence number of the expected Data Transmission DT) and the receiver status (receiver not ready), as shown by Transition arrow 87.

Whenever a Data Transmission DT with incorrect sequence number arrives (Event RECEIVE_DT (SN<>V(R)), an acknowledgment message AK with the expected sequence number and the current receiver status is sent (Transition arrow 88).

Whenever, in state READY, an Activation Request AR, for activation of a connection, is received (Event RECEIVE_AR), the protocol variables take on their pre-set values and a confirmation message AC is sent (Action SEND (AC)); the activation of the connection is indicated to the user (Action D_ACTIVATE_IND), as shown by Transition arrow 89.

1.3.4.4 AUT. TABLE OF THE DATA-LINK RECEIVING PROTOCOL ENTITY:

Table 4 is an automaton table for the data-link receiving protocol entity. The left column contains the respective transition arrow numbers shown in FIG. 8.

STATES: (Description above in section 1.3.4.3)
1) INACTIVE
2) START_UP
3) READY

EVENTS:
1) D_ACTIVATE$_{REQ}$
Input of a reqeust for connection activation.
2) RECEIVE_AR
Receipt of a request for connection activation.
3) RECEIVE_AC
Receipt of a confirmation of connection activation.
4) TA_EXPIRED AND (RC<MNT)
Allotted time for receipt of confirmation message AC has expired. The Maximum Number of Times of transmission repetition has not been exceeded.
5) TA_EXPIRED AND (RC=MNT)
Allotted time for receipt of confirmation message AC has expired. The Maximum Number of Times of transmission repetition has been reached.

6) RECEIVE_DT (SN=V(R)) and RECEIVE_STATUS=RECEIVE_READY
Input of an expected data message DT. The data-link receiving protocol entity is reception-ready.
7) RECEIVE_DT (SN=V(R)) & RECEIVE_STATUS=RECEIVE_NOT_READY
Input of an expected data message DT. The data-link receiving protocol entity is not reception-ready.
8) RECEIVE_DT (SN<>V(R))
Input of an unexpected data message DT.

ACTIONS/FUNCTIONS:
1) SEND (AR)
Sending of an Activation Request AR for connection activation.
2) SEND (AC)
Sending of an Activation Confirmation AC to confirm activation of a connection.
3) RESEND_AR
Repeated sending of an Activation Request AR for connection activation.
4) START_TA
Resetting & starting of timer to track allotted time $T_A$.
5) CANCEL_TA
Resetting timer used to track allotted time $T_A$.
6) RC:=1
Setting Repetition Count variable to the value 1.
7) RC:=RC+1
Incrementing Repetition Count RC by the value 1.
8) V(R):=1−V (R)
Complementing of receipt sequence variable V(R).
9) V(C):=RECEIVE_READY
Setting of connection status variable V(C) to the value RECEIVE_READY.
10) V(C):=NOT_ACTIVATED
Setting of connection status variable V(C) to the value NOT_ACTIVATED.
11) V(C):=RECEIVE_STATUS ()
The function RECEIVE_STATUS () determines the reception readiness of the receiving protocol entity. The returned value of the function (RECEIVE_READY or RECEIVE_NOT_READY) is attributed to the connection status variable V(C).
12) RESET VARIABLES ()
Loading the pre-set values into the protocol variables (see Table 2).
13) AK:=AK(SN=V(R), RS=V(C))
Formation of an acknowledgement message AK. The value of the reception sequence variable V(R) is attributed to the sequence number variable SN. The value of the connection status variable V(C) is attributed to the reception status variable RS.
14) D_ACTIVATE_CON (CONNECTION_STATUS=V(C))
Confirmation of the connection activation service.
15) D_ACTIVATE_IND ()
Indication of connection activation.
16) D_DATA_ACK_IND (DATA_LENGTH, DATA)
Indication of the correct receipt of a data message. As parameters, the data length DATA_LENGTH and the data DATA are furnished.

| ARROW | STATE | RESULT | ACTION(S) | SUBSEQ. STATE |
|---|---|---|---|---|
| 71 | INACTIVE | D_ACTIVATE_REQ | SEND (AR) START_TA | START_UP |

-continued

| ARROW | STATE | RESULT | ACTION(S) | SUBSEQ. STATE |
|---|---|---|---|---|
| 84 | INACTIVE | RECEIVE_AR | RC: = 1<br>SEND (AC)<br>V(C):=RECEIVE_READY<br>D_ACTIVATE_IND 0 | READY |
| 85 | START_UP | RECEIVE_AC<br>or<br>RECEIVE_AR | CANCEL_TA<br>V(C):=RECEIVE_READY<br>D_ACTIVATE_CON<br>(CONNECTION_STATUS:=<br>V(C)) | READY |
| 74 | START_UP | TA_EXPIRED<br>and<br>(RC < MNT) | RESEND_AR<br>START_TA<br>RC:=RC + 1 | START_UP |
| 75 | START_UP | TA_EXPIRED<br>and<br>(RC = MNT) | RESET VARIABLES ( )<br>V(C):=NOT_ACTIVATED<br>D_ACTIVATE_CON<br>(CONNECTION_STATUS:=<br>V(C)) | INACTIVE |
| 86 | READY | RECEIVE_DT<br>(SN = V(R)) and<br>RECEIVE_STATUS<br>=RECEIVE_READY | D_DATA_ACK_IND<br>(DATA_LENGTH, DATA)<br>V(R): = 1 − V(R)<br>V(C):=RECEIVE_STATUS<br>AK:= AK (SN:=V(R),<br>RS: = V(C))<br>SEND (AK) | READY |
| 87 | READY | RECEIVE_DT<br>(SN=V(R)) and<br>RECEIVE_STATUS<br>= RECEIVE_NOT<br>READY | AK:= AK (SN:=V(R),<br>RS: = RNR)<br>SEND (AK) | READY |
| 88 | READY | RECEIVE_DT<br>(SN < > V(R)) | V(C):=RECEIVE_STATUS<br>AK:= AK(SN: = V(R),<br>RS:= V(C)<br>SEND (AK) | READY |
| 89 | READY | RECEIVE_AR | RESET_VARIABLES ( )<br>SEND (AC)<br>D_ACTIVATE_IND ( ) | READY |

1.4 DESCRIPTION OF THE TRANSPORT PROTOCOL

The task of Transport Protocol 19 is the reliable transmission of data of arbitrary length. Data, whose length (aggregated with transport control information) exceeds the maximal data length of an individual CAN frame, are divided in transport layer 15 of the transmitter into segments, are separately transmitted, and are reunited in transport layer 15 of the receiver.

Transport Protocol 15 of the preferred embodiment operates according to the method "send-and-wait." Data are transmitted over virtual transport connections (see section 1.2 above). The arbitrarily long data transmission phase begins after successful connection activation (see section 1.1). After sending of a data message, the transport sending protocol entity awaits the receipt of a corresponding acknowledgement message. The next message (data segment or new data) is only allowed to be sent after input of the correct acknowledgement message for the preceding message. Whenever the transport sending protocol entity initiates the transmission of a message, there is a timer started, which measures the maximal waiting time $T_A$ allotted until receipt of the acknowledgement message. The transport receiving protocol entity answers each correctly received data message by sending an acknowledgement message, which contains additional information about the status of the transport receiving protocol entity, which information is needed by the transport sending protocol entity for flow control.

Whenever the allotted time $T_A$ expires before receipt of the acknowledgement, the transport sending protocol entity repeats transmission of the last message. After repeated unsuccessful transmissions of a message, the transport connection is deactivated. The result of the transmission and the deactivation of the connection are indicated to the user.

1.4.1 SERVICES (See Table 5)

1.4.1.1 PROTOCOL INITIALIZATION

The service elements for the initialization of the Transport Protocol are T_INIT.req and T_INIT.con. The initialization is requested with T_INIT.req and confirmed by T_INIT.con. The effect of the initialization is only local: the variables of the Transport Protocol are loaded with their pre-set values (see Table 6).

1.4.1.2 CONNECTION ACTIVATION

The service elements for the activation of a transport connection are T_ACTIVATE.req, T_ACTIVATE.ind, and T_ACTIVATE.con. The effect of T_ACTIVATE.req is to place the connection-service-providing transport protocol entities in a communication-ready state in which the protocol variables take on their pre-set values. Whenever connection user A makes the service request T_ACTIVATE.req, after successful activation this is indicated to connection user B in the remote station by means of T_ACTIVATE.ind. The service element T_ACTIVATE.con confirms the service request.

1.4.1.3 DATA TRANSMISSION

The service elements for data transmission are T_DATA.req, T_DATA.ind, and T_DATA.con. With T_DATA.req, one requests the transmission with acknowledgement of data (parameter: DATA) of length DATA_LENGTH. After correct transmission, the receipt of the data is indicated to the communication partner by means of the service element T_DATA.ind. The result of the transmission is confirmed to the service requester by means of service element T_DATA.con.

1.4.1.4 CONNECTION DEACTIVATION

After repeated unsuccessful transmissions, a connection is deactivated by the service provider. The deactivation is indicated to the service user by the service element T_DEACTIVATED.ind.

TABLE 5

| PHASE | SERVICE ELEMENT(S) | PARAMETER(S) |
| --- | --- | --- |
| PROTOCOL INITIALIZATION | T_INIT.req<br>T_INIT.con | 0<br>(INIT_STATUS) |
| CONNECTION ACTIVATION | T_ACTIVATE.req<br>T_ACTIVATE.ind<br>T_ACTIVATE.con | 0<br>0<br>(CONNECTION_STATUS) |
| DATA TRANSMISSION | T_DATA.req<br>T_DATA.ind<br>T_DATA.con | (DATA_LENGTH, DATA)<br>(DATA_LENGTH, DATA)<br>(TRANSFER_STATUS) |
| CONNECTION DEACTIVATION | T_DEACTIVATED.ind | 0 |

1.4.2 TRANSPORT MESSAGES

For the transport messages, which are exchanged between the transport protocol entities, the same applies as for the data-link messages. They also are transmitted with the aid of CAN frames. The individual partial field of the data field of the CAN frames are, however, in part differently occupied for transport messages. This is explained in the following description of FIGS. 9 and 10. The Transport Protocol distinguishes four message types AR, AC, DT and AK:

| | |
| --- | --- |
| AR (ACTIVATION REQUEST) | Activation message for activation of a transport connection. |
| AC (ACTIVATION CONFIRM) | Confirmation message to confirm activation of a transport connection. |
| DT (DATA) | Data message for transmission of data via a transport connection. |
| AK (DATA ACKNOWLEDGEMENT) | Acknowledgement message to confirm receipt of a transport message via a transport connection. |

Figure 9:
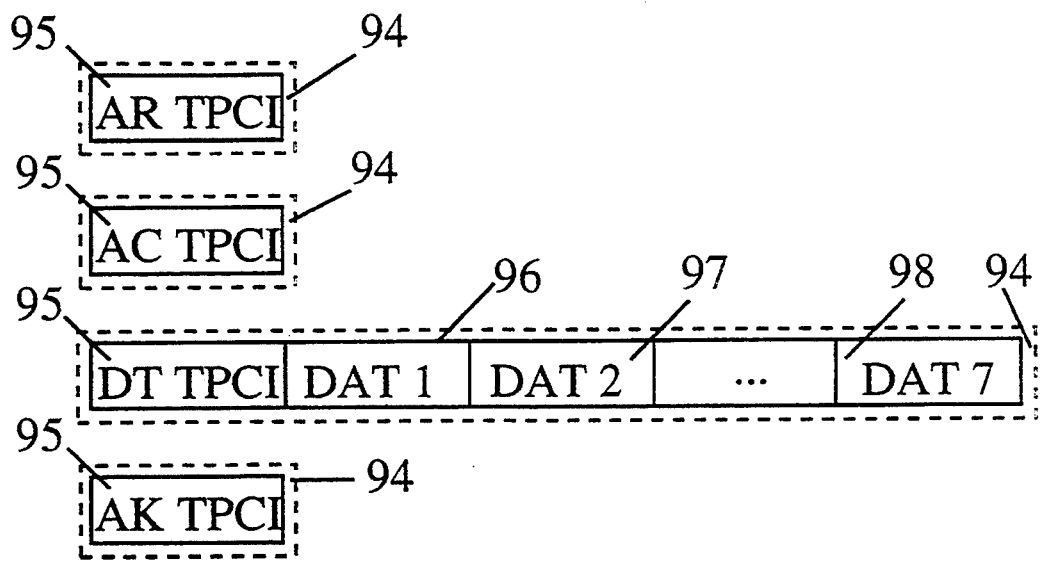
FIG. 9 illustrates the format of the DATA field of the frame during the transmission of various transport messages.

FIG. 9 illustrates the data fields 94 of the frames which transmit the individual messages of the Transport Protocol. In the case of messages AR, AC, DT and AK, data fields 94 contain a control information field 95, and, in the case of data transmission DT, additionally fields 96, 97, 98 for holding the individual data bytes which are to be transmitted by this message DT. The message type is identified by means of accompanying control information (TPCI), which is contained in the control information field of the frame transmitting the message. The control information consists of at most one byte and is found in data field 95 of a CAN frame.

Figure 10:
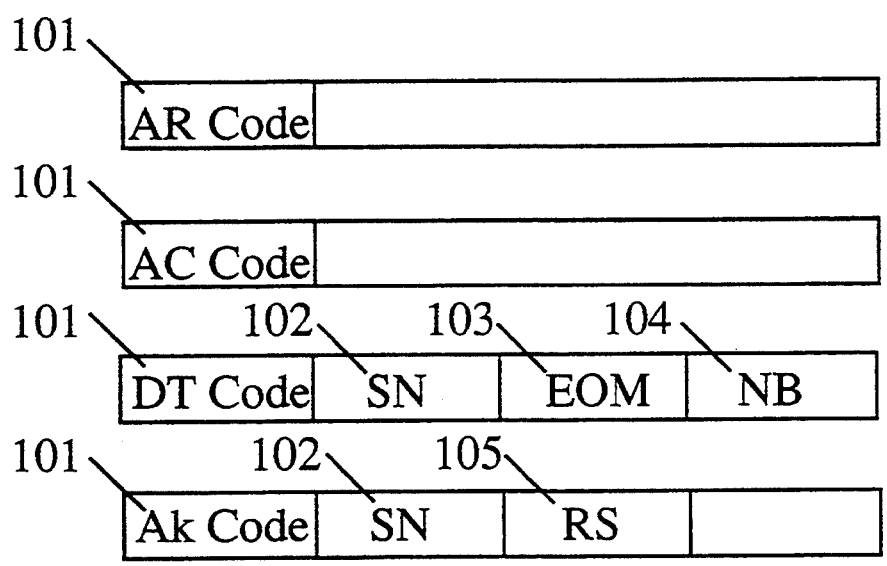
FIG. 10 illustrates the format of the CONTROL INFORMATION field of the frames during transmission of various transport messages.

FIG. 10 illustrates the composition of the control information fields 95 for frames for transmission of the various message types. In order to distinguish among the 4 message types, within control information field 95, there is provided a field 101 for holding a message code. Further, the control information fields 95 of frames for transmission of message types DT and AK contain a field 102 for holding the Sequence Number SN. The Sequence Number serves to distinguish among successive DT messages, for association of acknowledgement messages to data messages DT, and for the recognition of message duplicates. Field 102 for holding the sequence number SN comprises here at least one bit. Further, the control information field 95 of a frame used for transmitting a data message includes a field 103 for holding an End Of Message code EOM. Field 103 comprises at least one bit. The information which is transmitted in this field indicates whether additional data segments follow (EOM=0) or not (EOM=1). Further, the control information field 95, of a frame which transmits a data message DT, contains a field 104 for holding information NB which indicates the NumBer of data segments which are being transmitted in the frame.

Field 104 contains at least 3 bits. A frame which transmits an acknowledgement message AK has a field 105 in which information about the status of the receiver is placed. The receiver status field 105 includes at least one bit for indicating whether the receiver is reception-ready or not, as in FIG. 6.

Figure 11:
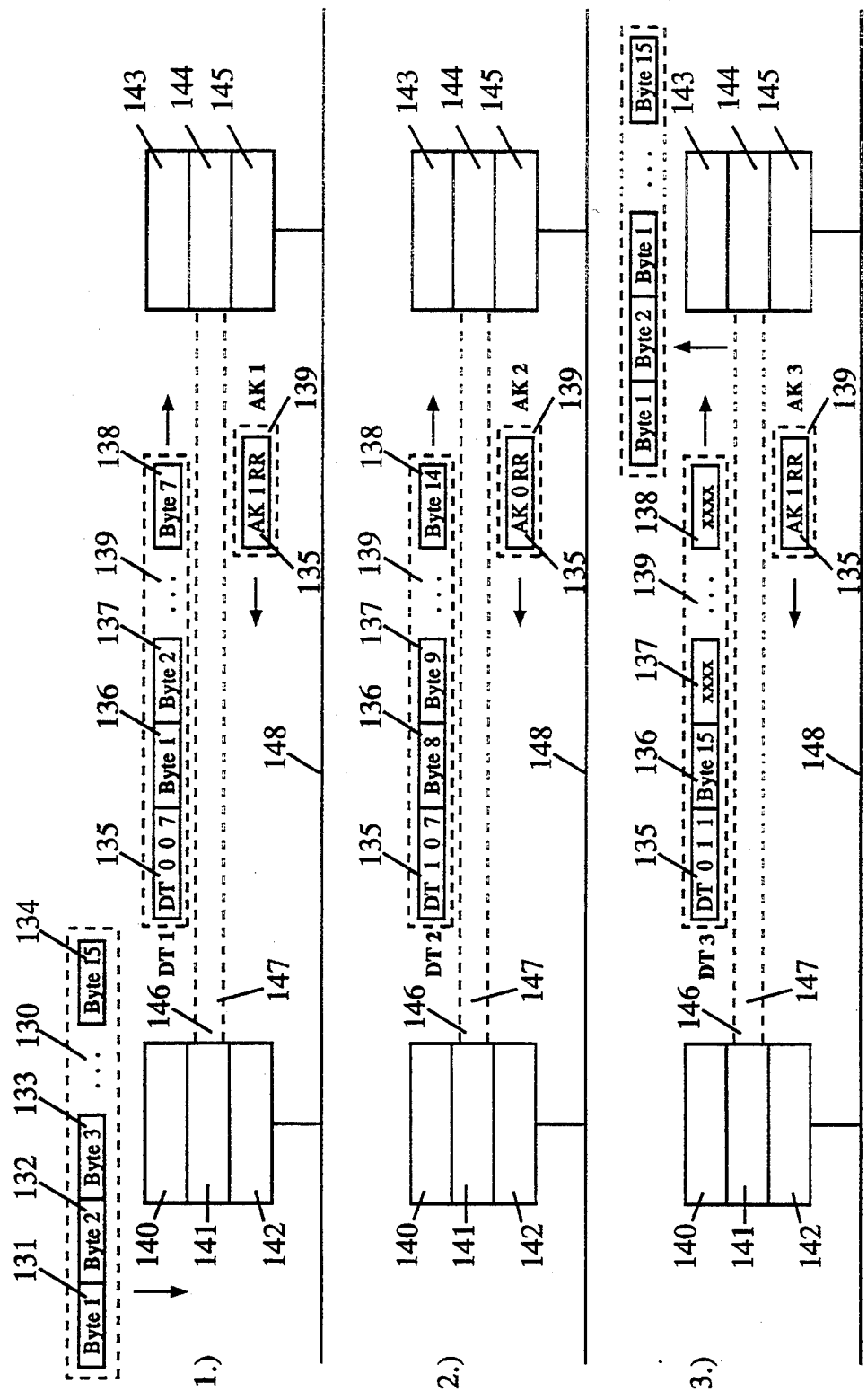
FIG. 11 is an example of the segmented transmission of a 15-byte-long data record.

FIG. 11 illustrates the transaction of a data transmission between two stations with the aid of the transport protocol. In this way, 15 data bytes are transmitted. The 15 data bytes are shown in field 130, represented by the dashed box at top. Field 130 comprises data byte subfields 131, 132, 133, . . . 134 for data bytes 1, 2, 3, . . . 15, respectively. To clarify the transaction of the data transmission, various different functional layers are represented within a station. Layer 140 is the Application Layer within the first station, in which the application program is executed. Compare ISO Standard 7498, section 5.7.6.5, "Segmenting, blocking, and concatenation." Layer 143 is the application layer within the second station. Layer 141 is the transport layer of the first station, in which Transport Protocol 19 accepts tasks from the application layer and carries them out. Layer 144 is the transport layer of the second station. Between the two transport layers 141 and 144, there is illustrated, using dashed lines 146 and 147, the virtual transport connection.

Transport Protocol 19 in layer 141, in order to carry out a transport message transmission among the associated stations, makes use of CAN Protocol 17, which is found in layer 142. Layer 145 contains the CAN Protocol 17 of the second station. In turn, CAN Protocol 17 makes uses of CAN bus connection 148 between the stations for data transmission purposes.

The data transmission of 15 data bytes in field 130 occurs in three steps, with the help of Transport Protocol 19. In the first step, data bytes 1–7 are transmitted. For this, the Transport Protocol entity generates data message DT1, as shown in FIG. 11, top third. This message is then transmitted by the CAN protocol entity using a CAN frame. The structure of data field 139 of the frame for transmission of data message DT1 is illustrated in FIG. 11. In control information field 135 of the frame, one places the message code DT, the sequence number 0, the end-of-message code 0, and the number 7 for the count of the data bytes. The remaining data byte fields of the frame are occupied by the first seven bytes of the 15 data bytes to be transmitted. For example, data byte fields 136, 137, and 138 are illustrated.

After receipt of data message DT1, the receiving station sends acknowledgement message AK1 back to the sending station. Data field 139 of the frame which carries the acknowledgement message AK1, consists only of control information field 135. This field contains message code AK, sequence number 1 and receiver status information RR (corresponds to correct receipt of a data message).

In the second step, data bytes 8-14 are transmitted. This occurs with the help of data message DT2. Data field 139 of the frame which carries data message DT2 is, as in the first step, subdivided. Data byte fields 136, 137 and 138 contain the data bytes 8, 9 and 14. Control information field 135 of the frame contains the message code DT, the sequence number 1, the message decode 0, and the number 7 for the count of the data bytes. The receiving station confirms the receipt of data message DT2 by means of acknowledgement message AK2. Control information field 135 of the frame which carries acknowledgement message AK2 is occupied just as in step 1, except that, for the sequence number, a 0 is placed in control information field 135.

In a third step, the last data byte 15 is transmitted. This occurs with the help of data message DT3. Data field 139 of the frame which carries data message DT3 is subdivided differently from the data fields in steps 1 and 2. Data byte field 136 contains the 15th data byte, and the remaining data byte fields, of which 137 and 138 are examples, contain no relevant information, as shown by the x's in FIG. 11, bottom. Control information field 135 contains message code DT, sequence number 0, message decode 1, and a 1 for the count of data bytes transmitted. The receiving station confirms the receipt of data message DT3 by acknowledgement message AK3. Control information field 135 of the frame which carries acknowledgement message AK3 is occupied just as in step 1. As a result, all 15 data bytes have been transmitted to the second station, and application layer 143 of the second station can further process them.

1.4.3 VARIABLES AND PARAMETERS

The Protocol uses the following variables and parameters (see Table 6):

1) SEND SEQUENCE VARIABLE V(S)

Variable for sequential numbering of data messages DT. V(S) can assume the values 0 and 1. After receipt of a correct acknowledgement message AK, the value of V(S) is complemented.

2) RECEIPT SEQUENCE VARIABLE V(R)

Variable for storing the sequence number of the expected next-to-arrive data message DT. V(R) can assume the values 0 and 1. After correct receipt of the expected data message DT, the value of V(R) is complemented.

3) CONNECTION STATUS VARIABLE V(C)

Variable for storing the status of a connection. The variable can assume the values NOT_ACTIVATED, DEACTIVATED, RECEIVE_READY and RECEIVE_NOT_READY.

4) TRANSMISSION REPETITION COUNT VARIABLE RC

Variable for storing the actual count of repetitions of transmissions of message types AR and DT.

5) NUMBER OF SEGMENTS NSEG

The number of data segments which are needed for the transmission of particular data.

6) DATA LENGTH DL

Variable of the transport receiving protocol entity for counting the data length of the received message.

7) TPDU-VARIABLE EOM

Variable for indicating whether additional data segments follow (EOM=0) or not (EOM=1).

8) TPDU-VARIABLE NB

Number of the relevant Bytes in the data field. For data segments 1 through NSEG-1, variable NB has the value 7.

9) TPDU-VARIABLE SN

Sequence Number variable of message types AR and DT.

10) TPDU-VARIABLE RS

Variable of acknowledgement AK for indicating the status of the transport receiving protocol entity. RS can assume the values RR (Receive Ready) and RNR (Receive Not Ready).

11) PROTOCOL PARAMETER MNT

MNT is the Maximum Number of Times of automatic retransmission for a data message DT or for a connection Activation Request AR.

12) PROTOCOL PARAMETER NSEG_MAX

Maximum count of data segments.

13) PROTOCOL PARAMETER $T_A$ $T_A$ is the Time Allotted for receipt of an acknowledgement AK or an Activation Confirmation AC.

TABLE 6

| NAME | MEANING | VALUE RANGE | PRE-SETTING |
|---|---|---|---|
| PROTOCOL VARIABLES | | | |
| V(S) | SENDING SEQ. COUNTER | [0,1] | 0 |
| V(R) | RECEIPT SEQ. COUNTER | [0,1] | 0 |
| V(C) | CONNECTION STATUS | (NOT_ACTIVATED, DEACTIVATED, RECEIVE_READY, RECEIVE_NOT_READY] | NOT_ACTIVATED |
| RC | REPETITION COUNTER | [0,MNT] | 0 |
| NSEG | NUMBER OF DATASEGMENTS | [0, NSEG_MAX] | 0 |
| DL | DATA LENGTH IN BYTES | [0, NSEG_MAX*7] | 0 |
| TPDU VARIABLES | | | |
| EOM | END OF MESSAGE | [0,1] | — |
| NB | NUMBER BYTES, LAST SEG. | [1,7] | 7 |
| SN | SEQUENCE NUMBER | [0,1] | 0 |
| RS | RECEIVER STATUS | [RR,RNR] | — |
| PROTOCOL PARAMETERS | | | |
| MNT | | Maximum Number of Times for re-transmission | |
| NSEG_MAX | | Number of Segments (MAXimum) of data | |

TABLE 6-continued

| NAME | MEANING | VALUE RANGE | PRE-SETTING |
|---|---|---|---|
| $T_A$ | Time Allotted for acknowledgment | | |

1.4.4 STATE DIAGRAMS AND AUTOMATON TABLES
1.4.4.1 STATE DIAGRAM OF THE TRANSPORT-SENDING PROTOCOL ENTITY

Figure 12:
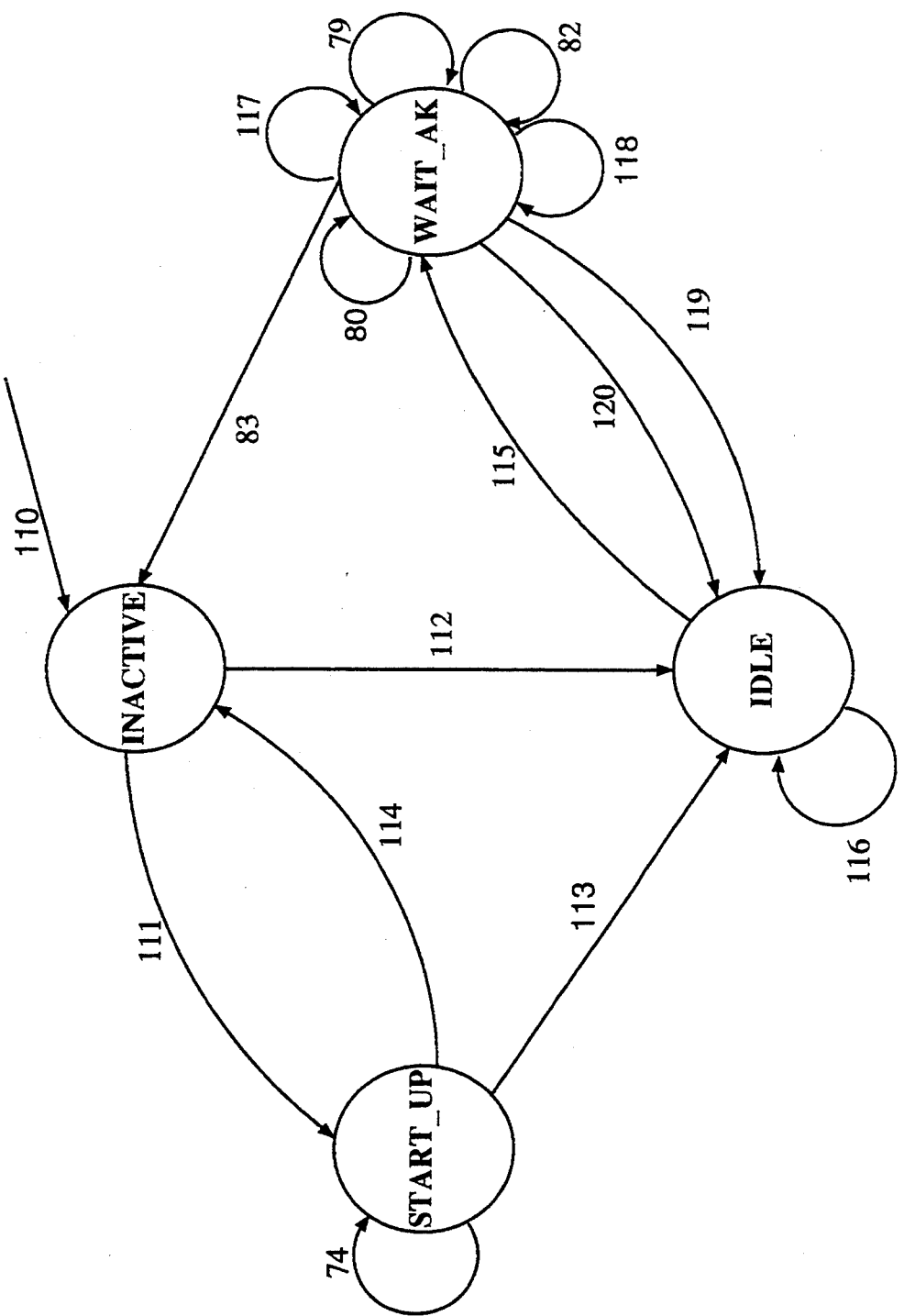
FIG. 12 is a state diagram of a TRANSPORT transmitting protocol example.

FIG. 12 is the state diagram of the transport transmitting or sending protocol entity. For FIG. 12, the same format applies as in FIGS. 7 and 8. The transport sending protocol entity has the following states:

1) INACTIVE

The state INACTIVE is assumed after initialization of the protocol entity. In this state, the transport protocol entity awaits a request for activation of the connection (Event T_ACTIVATE_REQ) or input of an Activation Request AR of the partner protocol entity. When the event T_ACTIVATE_REQ occurs, the Activation Request AR is sent to the transport receiving protocol entity (Action SEND (AR)), and the subsequent state START_UP is assumed (Transition arrow 111).

Whenever, during state INACTIVE, (before input of connection activation request) an Activation Request AR for connection activation occurs (Event RECEIVE_AR), an Activation Confirmation AC is sent (Action SEND (AC)) and the subsequent state IDLE is assumed, in which the transport sending protocol entity accepts requests for acknowledged transmissions of data (Transition arrow 112).

2) START_UP

In state START_UP, the transport sending protocol entity awaits the Activation Confirmation AC (confirmation of connection activation) of the addressed transport receiving protocol entity.

After receipt of the Activation Confirmation AC or after receipt of Activation Request AR (connection activation desire of the transport receiving protocol entity), the transport transmitting protocol entity shifts into state IDLE, in which it accepts requests for transmission of data (Transition arrow 113). The addressed transport protocol receiving entity goes quasi-simultaneously into state READY (see Transition arrow 123 on FIG. 13). Whenever, after expiration of allotted time $T_A$, Activation Confirmation AC has not arrived (Event TA_EXPIRED and (RC<MNT)), the sending of Activation Request AR is automatically repeated (Transition arrow 74). After MNT unacknowledged transmissions of Activation Request AR (Event TA_EXPIRED and (RC=MNT)), the transport transmitting protocol entity shifts back into state INACTIVE and indicates the unsuccessful connection activation to the user (Transition arrow 114).

3) IDLE

In state IDLE, the transport transmitting protocol entity awaits a request for transmission of data. After occurrence of the corresponding event T_DATA_REQ, the number NSEG of data segments is calculated and the data message DT with the control information and first data segment is generated, sent (Action SEND (DT)), and the subsequent state WAIT_AK is assumed (Transition arrow 115). Whenever, in state IDLE, an Activation Request AR for connection activation occurs (Event RECEIVE AR), the protocol variables are loaded with their pre-set values, an Activation Confirmation AC is sent (Action SEND (AC)), and the activation is indicated to the user (Action T_ACTIVATE_IND()), (Transition arrow 116).

4) WAIT_AK

In state WAIT_AK, the transport transmitting protocol entity awaits the receipt of acknowledgement message AK, which is supposed to confirm the correct receipt of the previous data message DT. Whenever the expected acknowledgement arrives (Event RECEIVE_AK (SN<>V(S)), NSEG is decremented, and, in the case of NSEG>=1, the message with the next data segment is generated and sent (Transition arrow 117). Whenever NSEG=0, after receipt of the acknowledgement, the correct transmission is indicated to the user, and the subsequent state IDLE is assumed (Transition arrow 119). Whenever, after expiration of allotted time $T_A$, acknowledgement AK has not arrived (Event TA_EXPIRED and (RC<MNT)), the sending of data message DT is automatically repeated (Transition arrow 82). After MNT unacknowledged retransmissions of data message DT (Event TA_EXPIRED and (RC=MNT)), the connection is deactivated; the transport transmitting protocol entity shifts back into state INACTIVE, and indicates the unsuccessful transmission and the deactivation of the connection to the user (Transition arrow 83). Acknowledgements with incorrect sequence numbers (Event RECEIVE_AK (SN =V(S)) are ignored in state WAIT_AK (Transition arrows 79, 80). Whenever an acknowledgement AK is received which indicates that the receiving entity is not ready (Event RECEIVE_AK (SN=VC/S), RS=RNR), the resending of the preceding data message DT is delayed (Transition arrow 80). Whenever, in state WAIT_AK, an Activation Request AR for connection activation occurs (RECEIVE_AR), the protocol variables are loaded with their pre-set values, Activation Confirmation AC is sent, and the subsequent state IDLE is assumed (Transition arrow 120). The current data transmission is thereby broken off; the unsuccessful data transmission and the connection activation are indicated to the user.

1.4.4.2 AUTOMATON TABLE OF THE TRANSPORT-SENDING PROTOCOL ENTITY

Table 7 is the automaton table of the sending protocol entity. The left column contains the transition arrow nos. of FIG. 12.

STATES: (For description, see 1.4.4.1 above)
1) INACTIVE
2) START_UP
3) IDLE
4) WAIT_AK EVENTS:
1) T_ACTIVATE_REQ
Input of a request for connection activation.

2) RECEIVE_AR
Receipt of a request for connection activation.
3) RECEIVE_AC
Receipt of a confirmation of connection activation.
4) TA_EXPIRED and (RC<MNT)
Allotted time for receipt of confirmation AC or acknowledgement AK has expired. The Repetition Count of retransmissions has not reached the Maximum Number of Times.
5) TA_EXPIRED and (RC=MNT)
Allotted time for receipt of confirmation AC or acknowledgement AK has expired. The Repetition Count of retransmissions has reached the Maximum Number of Times.
6) T_DATA_REQ (DATA_LENGTH, DATA)
Input of a request for transmission of data DATA of length DATA_LENGTH.
7) RECEIVE_AK (SN<>V(S)) and (NSEG>1)
Receipt of an acknowledgement, which confirms the correct receipt of the preceding data message DT, with at least two additional data segments to be transmitted.
8) RECEIVE_AK (SN<>V(S)) and (NSEG=1)
Receipt of an acknowledgement, which confirms the correct receipt of the preceding data message DT, with one additional data segment to be transmitted.
9) RECEIVE_AK (SN<>V(S)) and (NSEG=0)
Receipt of an acknowledgement, which confirms the correct receipt of the preceding data message DT, including the last data segment. The transmission of data is thus concluded.
10) RECEIVE_AK (SN=V(S), RS=RR)
Receipt of an acknowledgement, whose sequence number is identical with the sequence number of the preceding message DT. This event can occur whenever, due to expiration of allotted time, a data message is retransmitted, and the receiver recognizes this message as a duplicate. The status information RS indicates the receiver is ready.
11) RECEIVE_AK (SN=V(S), RS=RNR)
Receipt of an acknowledgement, whose sequence number is identical with the sequence number of the preceding message DT. This event can occur whenever the transport protocol receiving entity cannot accept a data message DT. The status information RS indicates the receiver is not reception-ready.

ACTIONS/FUNCTIONS:
1) SEND (AR)
Sending of a message AR for connection activation.
2) SEND (DT)
Sending of a message DT.
3) SEND (AC)
Sending of a message AC to confirm connection activation.
4) RESEND_AR
Repeating sending of request AR for connection activation.
5) RESEND_LAST_DT
Repetition of sending of last data message DT.
6) START_TA
Resetting and starting of timer for monitoring time $T_A$.
7) CANCEL_TA
Resetting (clearing) of timer for monitoring time $T_A$.

8) IF (DATA_LENGTH MOD 7) THEN NSEG:=DATA_LENGTH/7
Calculation of the segment count NSEG in the case that the data length is divisible by 7 without a remainder.
9) NSEG:=INT (DATA_LENGTH/7)+1
Calculation of the segment count NSEG in the case that the data length is not divisible by 7 without a remainder. The function INT(X) rounds the real number X and returns a corresponding integer value.
10) IF (NSEG>1)
THEN (EOM:=0, NB:=7)
ELSE (EOM:=1, NB:=DATA_LENGTH)
In dependence upon NSEG, the control variables EOM and NB are set.
11) NSEG:=NSEG−1
Decrementing of segment count after successful segment transmission.
12) IF (RS(AK)=RR) (SEND (DT))
Data message DT with the next data segment is sent whenever the transport receiving protocol entity, in the last acknowledgement message, indicated its reception readiness. Otherwise, message DT is sent only after passage of waiting time $T_A$.
13) RC:=1
Setting of transmission Repetition Count to the value 1.
14) RC:=RC+1
Incrementing of transmission Repetition Count by value 1.
15) V(S):=1−V(S)
Complementing of sending sequence variable V(S).
16) V(C): =RECEIVE_READY
Setting of connection status variable V(C) to the value RECEIVE_READY.
17) V(C):=DEACTIVATED
Setting of connection status variable V(C) to DEACTIVATED.
18) V(C):=NOT_ACTIVATED
Setting of connection status variable V(C) to the value NOT_ACTIVATED.
19) RESET_VARIABLES
Loading of protocol variables with their pre-set values (see Table 6).
20) DT:=DT (SN=V(S), EOM=..., NB=...)
Generation of a data message DT. The sequence number variable SN is loaded with the value of send sequence variable V(S). The values of EOM and NB are set in dependence upon the number of still-to-be-transmitted data segments.
21) D_ACTIVATE_CON (CONNECTION STATUS:=V(C))
Confirmation of connection activation service.
22) D_ACTIVATE_IND ()
Indication of a connection activation.
23) D_DATA_ACK_CON (TRANSFER_STATUS:=SUCCESS)
Positive confirmation of data transmission service.
24) D_DATA_ACK_CON (TRANSFER_STATUS:=NO_SUCCESS)
Negative confirmation of data transmission service.
D_DEACTIVATED_IND
Indication of an automatic deactivation of a connection.

TABLE 7

| ARROW | STATE | RESULT | ACTION(S) | SUBSEQ. STATE |
|---|---|---|---|---|
| 111 | INACTIVE | T_ACTIVATE_REQ | SEND (AR) START_TA RC: = 1 | START_UP |
| 112 | INACTIVE | RECEIVE_AR | SEND (AC) V(C):=RECEIVE_READY T_ACTIVATE_IND ( ) | IDLE |
| 113 | START_UP | RECEIVE_AC or RECEIVE_AR | CANCEL_TA V(C):=RECEIVE_READY T_ACTIVATE_CON (CONNECTION_STATUS:= V(C)) | IDLE |
| 74 | START_UP | TA_EXPIRED and (RC < MNT) | RESEND_AR START_TA RC:=RC + 1 | START_UP |
| 114 | START_UP | TA_EXPIRED and (RC = MNT) | RESET VARIABLES ( ) V(C):=NOT_ACTIVATED T_ACTIVATE_CON (CONNECTION_STATUS:= V(C)) | INACTIVE |
| 115 | IDLE | T_DATA_REQ (DATA_LENGTH, DATA) | IF (DATA_LENGTH MOD7 = 0 THEN NSEG:=DATA_LENGTH/7) ELSE NSEG:= INT(DATA_LENGTH/7)+1 IF NSEG > 1 THEN (EOM:=0, NB:=7) ELSE (EOM:= 1, NB:=DATA_LENGTH) DT:=DT(SN:=V(S), EOM, NB) SEND (DT), START_TA NSEG: = NSEG−1 RC:= 1 | WAIT_AK |
| 116 | IDLE | RECEIVE_AR | RESET VARIABLES ( ) SEND (AC) T_ACTIVATE_IND ( ) | IDLE |
| 117 | WAIT_AK | RECEIVE_AK (SN <> V(S)) and (NSEG > 1) | CANCEL_TA V(S): = 1 − V(S) NSEG:= NSEG − 1 DT: = DT (SN:=V(S), EOM: = 0, NB: = 7 IF (RS(AK) = RR) [SEND (DT)] START_TA, RC: = 1 | WAIT_AK |
| 118 | WAIT_AK | RECEIVE_AK (SN <> V(S)) and (NSEG = 1) | CANCEL_TA V(S): = 1 − V(S) NSEG:= NSEG − 1 DT: = DT (SN:=V(S), EOM: = 1, NB:=DATA_LENGTH MOD7 IF (RS(AK) = RR) [SEND (DT)] START_TA, RC: = 1 | WAIT_AK |
| 119 | WAIT_AK | RECEIVE_AK (SN <> V(S)) and (NSEG = 0) | CANCEL_TA V(S): = 1 − V(S) T_DATA_CON (TRANSFER STATUS: = SUCCESS RC: = 0 | IDLE |
| 79 | WAIT_AK | RECEIVE_AK SN = V(S), RS=RR | (NO ACTION) | WAIT_AK |
| 80 | WAIT_AK | RECEIVE_AK (SN=V(S),RS:=RNR) | START_TA | WAIT_AK |
| 120 | WAIT_AK | RECEIVE_AR | RESET_VARIABLES ( ) SEND (AC) T_DATA_CON(TRANSFER_ STATUS:=NO_SUCCESS) T_ACTIVATE_IND ( ) | IDLE |
| 82 | WAIT_AK | (TA_EXPIRED) and (RC < MNT) | RESEND_LAST_DT START_TA RC:= RC + 1 | WAIT_AK |
| 83 | WAIT_AK | (TA_EXPIRED) and (RC=MNT) | RESET_VARIABLES ( ) V(C):= DEACTIVATED T_DATA_CON(TRANSFER_ STATUS:=NO_SUCCESS) T_DEACTIVATED_IND | INACTIVE |

Figure 13:
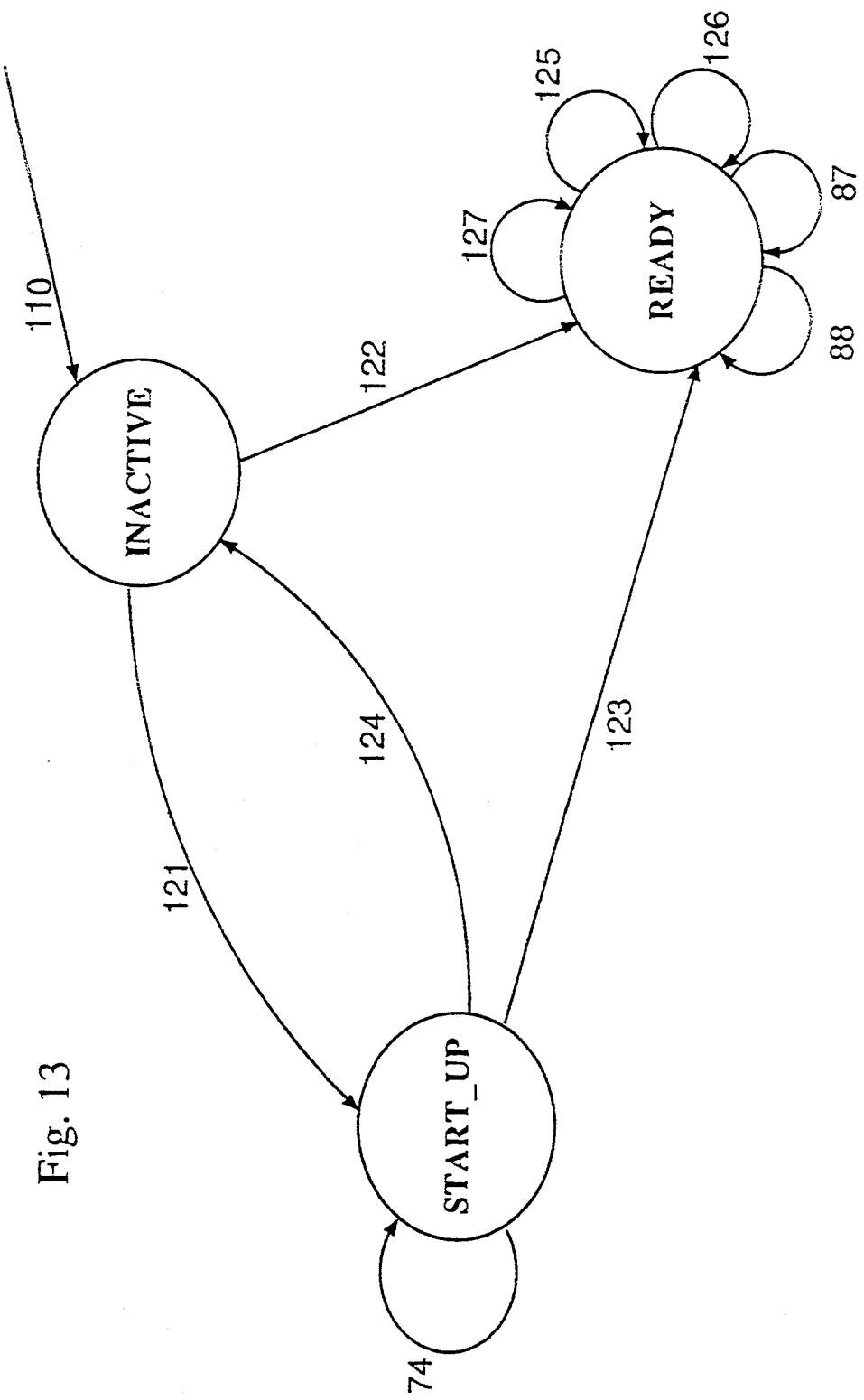
FIG. 13 is a state diagram of a TRANSPORT receiving protocol example.

1.4.4.3 STATE DIAGRAM OF THE TRANSPORT RECEIVING PROTOCOL ENTITY FIG. 13 is a state diagram of the transport receiving protocol entity. The same format applies as in FIGS. 7, 8, and 12. The transport receiving protocol entity has the following states:

1) INACTIVE

After initialization, the transport receiving protocol entity finds itself in state INACTIVE. In this state, the protocol entity awaits receipt of a request for activation of the connection (Event T_ACTIVATE_REQ) or input of a connection activation message AR of the partner protocol entity. Whenever the event T_ACTIVATE_REQ occurs, the activation message AR is sent to the transport sending protocol entity (action SEND (AR)) and the subsequent state START_UP is assumed (Transition arrow 121).

Whenever, in state INACTIVE (before receipt of the connection activation request), the activation message AR for connection activation occurs (Event RECEIVE AR), a confirmation message AR is sent (Action SEND (AC)) and a subsequent state READY is assumed, in which the transport receiving protocol entity is ready to receive data (Transition arrow 122).

2) START_UP

In the state START_UP, the transport receiving protocol entity awaits the confirmation message AC (confirmation of connection activation) of the addressed sending protocol entity. After input of the confirmation message AC or after input of the activation message AR (desire of the transport sending protocol entity for connection activation) the transport receiving protocol entity shifts into the state READY, in which it is ready to receive data (Transition arrow 123). The corresponding transport sending protocol entity goes quasi-simultaneously into the state IDLE (see Transition arrow 113, FIG. 12). Whenever, after expiration of allotted time $T_A$, the confirmation message AC has not been received (Event TA expired and (RC<MNT)), the sending of the activation message AR is automatically repeated (transition arrow 74). After MNT unacknowledged transmissions of activation message AR (Event TA_EXPIRED and (RC =MNT)), the transport receiving protocol entity shifts back into state INACTIVE and indicates the unsuccessful connection activation to the user (Transition arrow 124).

3) READY

In the state READY, the transport receiving protocol entity awaits the input of a data message DT. After receipt of a corresponding message with the expected sequence number (Event RECEIVED_DT (SN=V(R)), the message is stored and acknowledgement message AK is sent (action SEND (AK)). In the event the message contains the last data segment (EOM=1) the arrival of the data is indicated to the user (Action T_DATA_END)) and (Transition arrow 126). Whenever, upon receipt of a data message DT, the transport receiving protocol entity is not reception-ready, the message is discarded and this indicated to the transmitter by the transmission of an acknowledgement message with unchanged sequence number (=Sequence number of the expected data message) and with the receiver status indication "receiver not ready" (Transition arrow 87).

Whenever a data message DT with incorrect sequence number arrives (Event RECEIVED_DT (SN<>V(R)), an acknowledgement message AK with the expected sequence number and the current receiver status is sent (Transition arrow 88).

Whenever, in state READY, an activation message AR for connection activation arrives (Event RECEIVE AR), the protocol variables are loaded with their pre-set values, a confirmation message AC is sent (Action SEND AC), and the activation is indicated to the user (transition arrow 127).

1.4.4.4 AUTOMATON TABLE OF THE TRANSPORT RECEIVING PROTOCOL ENTITY

Table 8 is the automaton table of the transport receiving protocol entity. The left column contains the transition arrow numbers of FIG. 13.

STATES: (For description, see Section 1.4.4.3 above)
1) INACTIVE
2) START_UP
3) READY

EVENTS

1) T_ACTIVATE_REQ
Input of a request for connection activation.
2) RECEIVE_AR
Receipt of a request for connection activation.
3) RECEIVE_AC
Receipt of a confirmation of connection activation.
4) TA_EXPIRED and (RC<MNT)
Allotted time for arrival of a confirmation message AC has expired. The maximum number of retransmissions has not been exceeded.
5) TA_EXPIRED and (RC=MNT)
Allotted time for arrival of an acknowledgement message AC has expired. The maximum number of retransmissions has been reached.
6) RECEIVE_DT (SN=V(R), EOM=0) and RECEIVE STATUS ()=RECEIVE READY.
Input of an expected data message DT. The message DT is followed by one or more messages with further associated data segments. The transport receiving protocol entity is reception ready.
7) RECEIVE_DT (SN=V(R), EOM=1) and RECEIVE_STATUS ()=RECEIVE READY.
Input of an expected data message DT. The data message DT contains the last segment of the data. The transport receiving protocol entity is reception-ready.
8) RECEIVE_DT (SN=V(R), and RECEIVE_STATUS ()=RECEIVE NOT READY.
Input of an expected data message DT. The transport receiving protocol entity is not reception-ready.
9) RECEIVE_DT (SN<>V(R))
Input of an unexpected data message DT.

ACTIONS/FUNCTIONS:

1) SEND (AR)
Sending of a message AR for connection activation.
2) SEND (AC)
Sending of a message AC for confirmation of connection activation.
3) RESEND_AR
Retransmission of a message AR for connection activation.
4) START_TA
Resetting and starting of the timer for monitoring the allotted time $T_A$.
5) CANCEL TA
Resetting of the timer for monitoring the allotted time $T_A$.
6) DL:=DL+7
Incrementation of data length DL by 7.
DL:=DL+NB(DT)

Incrementation of data length DL by the value NB of the received data message DT.

8) STORE_DATA ()

Storing of the most recently received data segment.

9) RC:=1

Setting of repetition count variable RC to the value 1.

10) RC:=RC+1

Incrementation of repetition count variable RC by value 1.

11) V(R):=1−V(R)

Complementation of receipt sequence variable V(R).

12) V(C):=RECEIVE_READY

Setting of connection status variable V(C) to the value RECEIVE_READY.

13) V(C):=NOT ACTIVATED

Setting of connection status variable V(C) to the value NOT_ACTIVATED.

14) V (C):=RECEIVE STATUS ()

Loading of the protocol variables with the preset values (see table 6).

16) AK:=AK (SN=V(R), RS=V(C)

Formation of an acknowledgement message AK. The sequence number variable SN is loaded with the value of the reception sequence variable V(R). The reception status variable RS is loaded with the value of the connection status variable V(C).

17) D_ACTIVATE_CON (CONNECTION STATUS:=V(C)

Confirmation of the connection activation service.

18) D_ACTIVATE_IND ()

Indication of a connection activation.

19) D DATA_ACK_IND (DATA LENGTH, DATA)

Indication of a correct receipt of data. As parameters, the data length DATA LENGTH and the DATA are provided.

| ARROW | STATE | RESULT | ACTION(S) | SUBSEQ. STATE |
|---|---|---|---|---|
| 121 | INACTIVE | T_ACTIVATE_REQ | SEND (AR)<br>START_TA<br>RC: = 1 | START_UP |
| 122 | INACTIVE | RECEIVE_AR | SEND (AC)<br>V(C):=RECEIVE_READY<br>T_ACTIVATE_IND ( ) | READY |
| 123 | START_UP | RECEIVE_AC<br>or<br>RECEIVE_AR | CANCEL_TA<br>V(C):=RECEIVE_READY<br>T_ACTIVATE_CON<br>(CONNECTION_STATUS:=V(C)) | READY |
| 74 | START_UP | TA_EXPIRED<br>and<br>(RC < MNT) | RESEND_AR<br>START_TA<br>RC:=RC + 1 | START_UP |
| 124 | START_UP | TA_EXPIRED<br>and<br>(RC = MNT) | RESET VARIABLES ( )<br>V(C):=NOT_ACTIVATED<br>T_ACTIVATE_CON<br>(CONNECTION_STATUS:=V(C)) | INACTIVE |
| 125 | READY | RECEIVE_DT<br>(SN=V(R),EOM=0)<br>and<br>RECEIVE_STATUS( )<br>=RECEIVE_READY | DL:=DL+7<br>STORE_DATA ( )<br>V(R):= 1 = V(R)<br>V(C):=RECEIVE_STATUS( )<br>AK:=AK (RS:=V(C),<br>SN:=V(R))<br>SEND (AK) | READY |
| 126 | READY | RECEIVE_DT<br>(SN=V(R),EOM=1)<br>and<br>RECEIVE_STATUS( )<br>= RECEIVE_READY | DL:= DL+NB(DT)<br>STORE_DATA ( )<br>T_DATA_IND (DATA_<br>LENGTH = DL,DATA)<br>V(R):= 1 − V(R)<br>V(C):=RECEIVE_STATUS<br>AK:= AK (RS=V(C),<br>SN=V(R))<br>SEND (AK)<br>DL: = 0 | READY |
| 87 | READY | RECEIVE_DT<br>(SN=V(R) and<br>RECEIVE_STATUS( )<br>= RECEIVE_NOT<br>_READY | AK:= AK(RS:=RNR,<br>SN:=V(R))<br>SEND (AK) | READY |
| 88 | READY | RECEIVE_DT<br>SN < > V(R)) | V(C):=RECEIVE_STATUS<br>AK:= AK(RS:=V(C)<br>SN:= V(R)<br>SEND (AK) | READY |
| 127 | READY | RECEIVE_AR | RESET_VARIABLES( )<br>SEND (AC)<br>T_ACTIVATE_IND( ) | READY |

The function (RECEIVE_STATUS) () tests the reception readiness of the transport receiving protocols entity. The return value of the function, namely RECEIVE_READY or RECEIVE_ NOT READY, is conveyed to the connection status variable V(C).

15) RESET$_{13}$ VARIABLES ()

1.4.4.5 SLIDING WINDOW TECHNIQUE

A variation of the transport protocol permits the transport sending protocol entity to transmit, sequentially, W data messages, without waiting for receipt of an acknowledgement message AK (this is the so-called sliding window technique, in which W=the size of the window). In this protocol variation, the transport receiving protocol entity can acknowledge receipt of multiple sequential data messages with a single acknowledgement message (so-called "acknowledgement accumulation").

Various changes and modifications are possible within the scope of the inventive concept. A primary physical application of the above-described protocols is in communication between a central microcomputer and other control chips in a motor vehicle, such as those responsible for:

ignition timing,
fuel injection,
brake fluid pressure for traction control,
dead-reckoning navigation, and
airbag release triggering.

However, the protocols may also be used in processing of received coded (Radio Data System) or uncoded radio signals, processing of data retrieved from compact disc or similar storage media, in diagnosis of vehicle malfunctions, and in numerous other physical applications where their utility will be apparent to those skilled in the vehicle engineering art.

We claim:

1. Method for exchange of data with the help of a message in data processing installations having at least two stations (33, 34) connected to one another via a bus, comprising the steps of:
   defining a connection (24) between a pair of stations (33, 34) by a pair of oppositely-directed channels (31, 32), each channel extending from a sending object (37, 36) stored in one of said pair of stations to a receiving object (35, 38) stored in the other of said pair of stations;
   defining, for purposes of each channel (31, 32), the station storing the sending object (37, 36) as a sending station, and the station storing the receiving object (35, 38) as a receiving station, said sending and receiving stations together defining the connection (24);
   transmitting each message, via said connection, in a frame which contains at least a header field and a data field, with said header field being at a beginning portion of said frame, identifying the frame, and indicating a priority value of the frame for purposes of automatic arbitration of access to said bus;
   establishing, activating and deactivating said connections (24), via said bus, between pairs of said stations (33, 34);
   exchanging messages using said connections; and
   said step of establishing connections including the steps of:
   storing, in each station of one said connection (24), information defining a sending object (36, 37), and
   storing, in each station of said connection (24), information defining a receiving object (35, 38);
   each of said sending object (36, 37) and said receiving object (35, 38) including a header field (39) and a data field (40);
   said header field (39) of said sending object (36, 37) specifying the content of a header field of a frame transmitted from said station (34, 33) in which said sending object (37, 36) is stored to said station (33, 34) in which a corresponding receiving object (35, 38) is stored; and
   said frame contains said header field (39) and a control information field (58, 95), which in turn contains at least one message code characterizing what kind of message said frame is carrying and thereby distinguishing among at least:
   a message (AR) requesting activation of a connection,
   a message (AC) confirming activation of a connection,
   a message (DT) transmitting data via said connection, and
   a message (AK) acknowledging receipt of a data message.

2. Method according to claim 1, further comprising the steps of
   activating a connection by sending an Activation Request (AR) from one of said connection-defining stations to the other,
   confirming receipt of said Request by sending an Activation Confirmation (AC) back from said other station; and
   indicating activation of said connection (24) to a user of said connection.

3. Method according to claim 1, wherein
   each of said connection-defining stations contains a memory adapted for storage of a connection status value;
   and further comprising the step of
   deactivating a connection by setting each of said memories of the stations defining said connection (24) to a predetermined value representing deactivation.

4. Method according to claim 1, wherein
   at least one predefined bit of said control information field is used to represent said message code.

5. Method according to claim 1, further comprising the steps of
   sending at least one Data Transmission message (DT) from said sending station to said receiving station;
   confirming receipt of said message in said receiving station by sending an AcKnowledgement message (AK) back from said receiving station to said sending station,
   each of said messages being transmitted in the form of a frame.

6. Method according to claim 1, further comprising the steps of
   allocating a portion (64,102) of said control information field (58, 95) of said frame for use as a sequence number (SN);
   and generating successive sequence numbers as part of successive frames, thereby permitting distinguishing among successive Data Transmission messages (DT), recognizing of duplicate messages, and facilitating association of AcKnowledgement messages (AK) with their respective Data Transmission messages (DT).

7. Method according to claim 6, wherein at least one bit is allocated for said sequence number (SN).

8. Method according to claim 1, further comprising allocating a portion (64,102) of a control information field (58, 95) of each frame which transmits an AcKnowledgement message (AK) for use as a receiver status field (65, 105).

9. Method according to claim 8, wherein at least one bit is allocated for said receiver status field (65, 105).

10. Method according to claim 1, wherein
    each frame which transmits an AcKnowledgement message (AK) contains a header field (39) which differs in at least one significant bit from a corresponding bit in a header field (39) of each frame which transmits a Data Transmission message (DT).

11. Method according to claim 10, wherein said at least one differing bit is the bit in last position (41) in each of said header fields (39).

12. Method according to claim 1, further comprising segmenting a message into multiple data segments;
transmitting different segments of said message in different frames; and
reassembling said multiple data segments into a single message, following receipt of said frames.

13. Method according to claim 12, further comprising allocating part of said control information field of each frame carrying merely one portion of a larger message for an indication that the frame contains only said portion.

14. Method according to claim 13, further comprising identifying each frame, which is carrying a final portion of a larger message, by an indication in a predetermined subfield (103) of its control information field (95).

15. Method according to claim 13, further comprising including, in said control information field (95) of each frame, an indication of a length of a following data field contained in said frame.

16. Method according to claim 15, wherein said indication of length of a following data field is contained only in one field (104) of a frame transmitting a last message segment.

17. Method according to claim 1,
further comprising
timing an interval between sending of a message and receipt of an acknowledgement of said message and, in the event of expiration of a predetermined allotted time, without receipt of such acknowledgement, automatically resending, said message.

18. Method according to claim 17, further comprising setting a predetermined Maximum Number of Times for resending of unacknowledged messages and, upon reaching said predetermined Maximum Number of Times, ceasing resending of a message.

19. Method according to claim 18, further comprising the steps of
upon exceeding said predetermined Maximum Number of Times, deactivating said connection, and
indicating, to a user of said connection, said deactivation.

20. A data communications system for transmitting, with acknowledgement, data messages comprising
at least two stations (33,34), each containing a computer;
an interface unit in each station;
a bus interconnecting the interface units of the stations;
means, in each interface unit, for generating and transmitting a frame, for receiving a frame, and for recognizing an error in a received frame;
means, within each station, for transferring data between the interface unit and the computer;
means, in each interface unit, for serial data communication over said bus;
wherein
said stations contain protocol means for establishing, activating, and deactivating connections, including sending objects and receiving objects, (24) among said stations;
for exchange of data, with acknowledgement, among stations, via activated connections, a first one of the stations defining a connection sends a Data Transmission (DT) to at least one other station, the other station sends back an AcKnowledgement (AK), the interface unit of the receiving station informs the computer of the receiving station of receipt of the Data Transmission (DT), and the interface unit of the sending station informs the computer of the sending station of receipt of the AcKnowledgement (AK).

21. A data communications system according to claim 20, further comprising, in each station, means for segmenting messages which exceed a predetermined length into shorter segments for purposes of transmission, thereby permitting transmission of arbitrarily long messages.

22. A data communications system according to claim 20,
wherein, for exchange of segmented data, with acknowledgement, among stations, via activated connections, a first one of the stations defining a connection sends a data segment to at least one other station, the other station sends back an AcKnowledgement (AK), the interface unit of the receiving station informs the computer of the receiving station of receipt of the data segment, and the interface unit of the sending station informs the computer of the sending station of receipt-of the AcKnowledgement (AK).

23. A data communications system according to claim 22, further comprising
means, in each interface unit, for assigned successive Sequence Numbers (SN) to successive data segments;
means, in each interface unit, for storing a next-expected Sequence Number;
means, in each interface unit, for storing a value representing status of a connection which its station defines;
means, in each interface unit, for storing count of retransmissions of a frame;
means, in each interface unit, for storing and decrementing an allotted time until expected receipt of an acknowledgement, and a Maximum Number of Times for retransmissions of a frame; and
means, in each interface unit, for storing a number of data bytes contained in a message.

24. method for exchange of data with the help of a message in data processing installations having at least two stations (33, 34) connected to one another via a bus, wherein
a first one of said at least two stations (33, 34) is defined as a sending station, and a second one of said stations is defined as a receiving station, said sending and receiving stations together defining a connection (24);
each message is transmitted in a frame;
said frame contains at least a header field and a data field;
said header field is at a beginning portion of said frame identifies the frame, and indicates a priority value of the frame for purposes of automatic arbitration of access to said bus, and wherein connections (24), via said bus, between pairs of said stations (33,34) are established, activated, and deactivated;
messages are exchanged using said connections:

wherein connections are established by the steps of
storing, in each station of a connection (24), information defining a sending object (36), and
storing, in each station of said connection (24), information defining a receiving object (35);
each of said sending object (36) and said receiving object (35) includes a header field (39) and a data field (40);
said header field (39) of said sending object (36) specifies the content of a header field of a frame transmitted from said station; and
said frame contains not only said header field (39) but also a control information field (58, 95), which in turn contains at least one message code, consisting of only two bits, characterizing what kind of message said frame is carrying and thereby distinguishing among at least:
a message (AR) requesting activation of a connection,
a message (AC) confirming activation of a connection,
a message (DT) transmitting data via said connection, and
a message (AK) acknowledging receipt of a data message.

* * * * *